United States Patent
Kim et al.

(10) Patent No.: US 9,942,855 B2
(45) Date of Patent: *Apr. 10, 2018

(54) MOBILE TERMINAL AND METHOD FOR MANAGING POWER THEREOF

(71) Applicant: Samsung Electronics Co., Ltd., Gyeonggi-do (KR)

(72) Inventors: Sang-Ho Kim, Gyeonggi-do (KR); Seok-Weon Seo, Gyeonggi-do (KR); Jung-Hee Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,126

(22) Filed: Mar. 17, 2017

(65) Prior Publication Data

US 2017/0195970 A1    Jul. 6, 2017

Related U.S. Application Data

(63) Continuation of application No. 14/557,062, filed on Dec. 1, 2014, now Pat. No. 9,609,601.

(30) Foreign Application Priority Data

Nov. 29, 2013   (KR) .................. 10-2013-0147830

(51) Int. Cl.
    *H04W 52/02* (2009.01)
(52) U.S. Cl.
    CPC ... *H04W 52/0264* (2013.01); *H04W 52/0277* (2013.01)
(58) Field of Classification Search
    CPC ......... H04W 52/0261; H04W 52/0264; H04W 52/0277

USPC .... 455/550.1, 572, 574, 343.1–343.6, 422.1, 455/403, 412.1, 412, 2, 418–442, 566; 379/433.01, 433.04, 433.08
See application file for complete search history.

(56) References Cited

U.S. PATENT DOCUMENTS

| | | | |
|---|---|---|---|
| 8,172,147 | B2 | 5/2012 | Smith |
| 2007/0249395 | A1* | 10/2007 | Kondo ............... H04N 5/63 455/556.1 |
| 2009/0164152 | A1* | 6/2009 | Creus ............... G06F 1/3203 702/63 |
| 2010/0048139 | A1 | 2/2010 | Sea et al. |

(Continued)

FOREIGN PATENT DOCUMENTS

| | | |
|---|---|---|
| KR | 1020070011690 | 1/2007 |
| KR | 1020090012788 | 2/2009 |

(Continued)

OTHER PUBLICATIONS

International Search Report dated Feb. 3, 2015 issued in counterpart applicaton No. PCT/KR2014/011590.

*Primary Examiner* — Keith Ferguson
(74) *Attorney, Agent, or Firm* — The Farrell Law Firm, P.C.

(57) ABSTRACT

A method for managing power in a mobile terminal is provided. The method includes determining whether residual power indicative of residual battery power of the mobile terminal is less than or equal to predetermined reference power, if a power management mode is run; generating guide data to be provided to a user based on the residual power, if the residual power is less than or equal to the reference power; and displaying the guide data.

18 Claims, 19 Drawing Sheets

(56) References Cited

U.S. PATENT DOCUMENTS

| | | | | |
|---|---|---|---|---|
| 2012/0015695 A1* | 1/2012 | Hackborn | ........... | G06F 11/3409 455/566 |
| 2014/0025322 A1* | 1/2014 | Yang | ................ | H04W 52/0258 702/63 |
| 2014/0068314 A1* | 3/2014 | Kim | ..................... | G06F 1/3212 713/340 |

FOREIGN PATENT DOCUMENTS

| KR | 1020100038969 | 4/2010 |
|---|---|---|
| KR | 1020120086019 | 8/2012 |
| KR | 1020120129257 | 11/2012 |
| KR | 1020130112617 | 10/2013 |

* cited by examiner

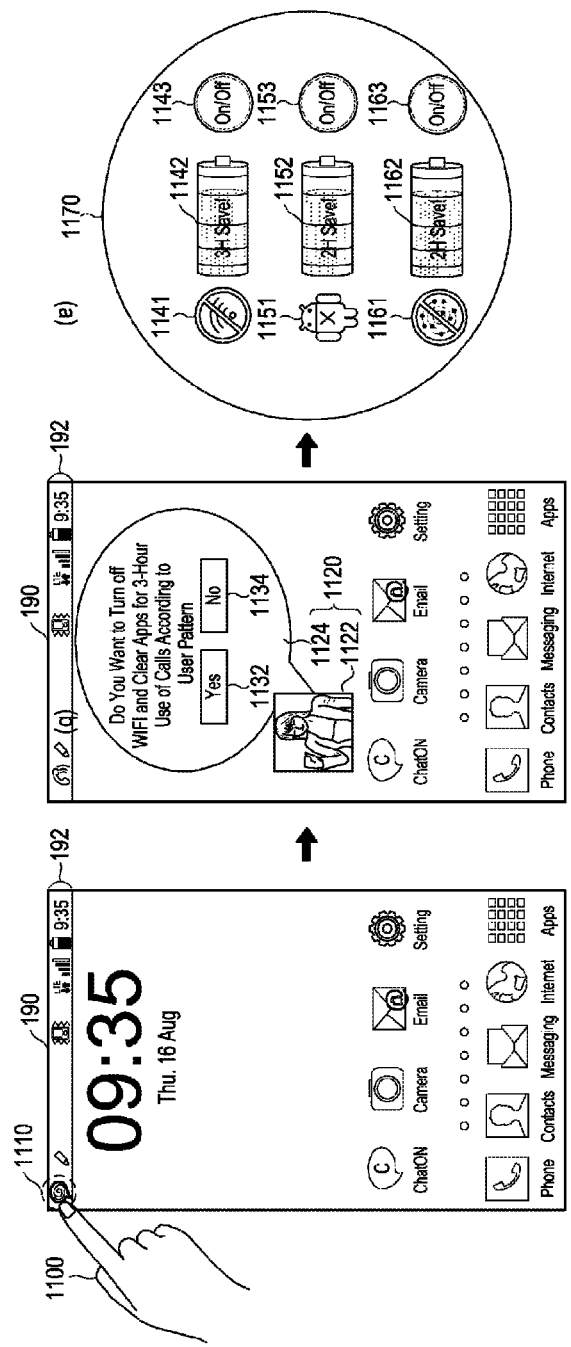

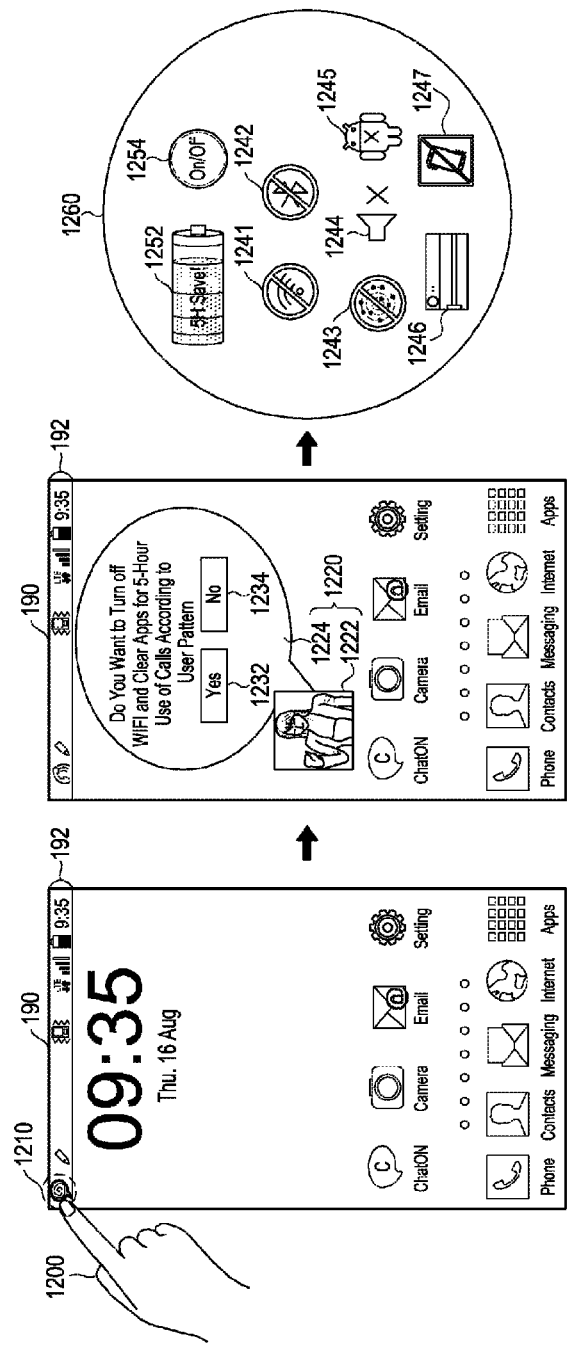

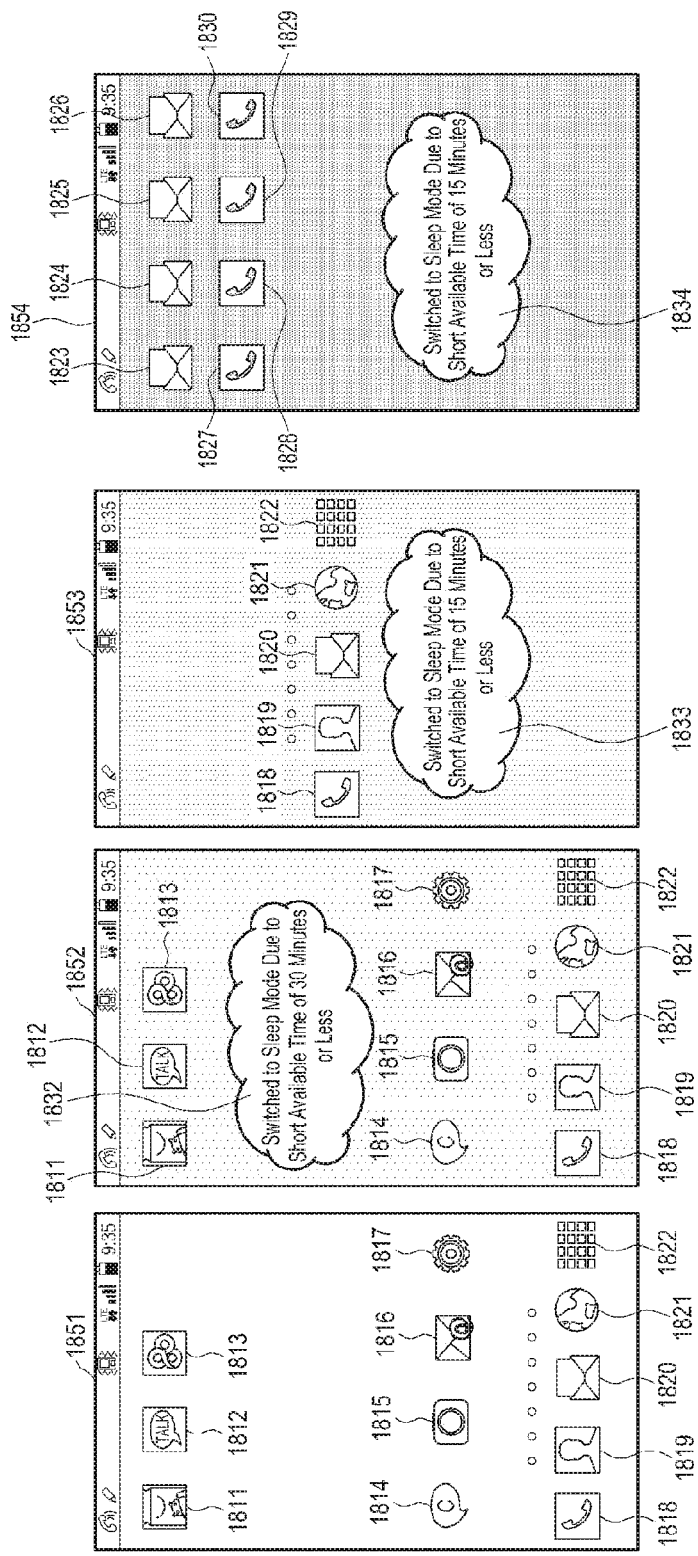

MOBILE TERMINAL AND METHOD FOR MANAGING POWER THEREOF

PRIORITY

This application is a Continuation Application of, and claims priority under 35 U.S.C. § 120 to, U.S. patent application Ser. No. 14/557,062, which was filed in the U.S. Patent & Trademark Office on Dec. 1, 2014, issued as U.S. Pat. No. 9,609,601 on Mar. 28, 2017, and claimed priority under 35 U.S.C. § 119(a) to a Korean Patent Application filed in the Korean Intellectual Property Office on Nov. 29, 2013 and assigned Serial No. 10-2013-0147830, the entire disclosure of which is incorporated herein by reference.

BACKGROUND OF THE INVENTION

1. Field of the Invention

The present disclosure relates generally to a method for managing power of a mobile terminal, and more particularly, to a mobile terminal for guiding a user, allowing the user to efficiently manage the residual power of the mobile terminal, and a method for managing power thereof.

2. Description of the Related Art

A mobile terminal refers to a portable device that a user can carry with him or her, and that has at least one of a voice/video call function, a function of inputting/outputting information, and a function capable of storing data. Recently, due to the diversity of its functions, a mobile terminal may have complex functions such as, for example, taking photos or videos, playback of music, video or files, playing of games, reception of broadcast, and the like, and may be implemented in the form of a comprehensive multimedia player.

Commonly, a battery pack that is detachably mounted in the rear of the mobile terminal may be used as a power supply means of the mobile terminal. The battery pack may be charged by being mounted in a predetermined charging device after being detached from the mobile terminal, or may be charged by being connected to the charging device while being mounted in the mobile terminal.

In a mobile terminal to which a variety of additional functions (or add-ons) are provided, not only the basic call function but also a variety of applications or modules may be simultaneously executed. When the variety of applications or modules are simultaneously executed, the power consumption of the mobile terminal, in particular, the Central Processing Unit (CPU), may significantly increase.

The mobile terminal, like other electronic devices, may limit the execution of applications or modules, if its power is less than a predetermined value. If the applications or modules are executed in a limited way, a user of the mobile terminal may experience disappointment in not executing or enjoying his/her desired applications or modules.

SUMMARY OF THE INVENTION

The present disclosure has been made to address at least the above-mentioned problems and/or disadvantages and to provide at least the advantages described below. Accordingly, an aspect of the present disclosure is to provide a mobile terminal for guiding a user, allowing the user to efficiently manage the residual power of the mobile terminal, and a method for managing power thereof.

In accordance with an aspect of the present disclosure, there is provided a method for managing power in a mobile terminal. The method includes determining whether residual power indicative of residual battery power of the mobile terminal is less than or equal to predetermined reference power, if a power management mode is run; generating guide data to be provided to a user based on the residual power, if the residual power is less than or equal to the reference power; and displaying the guide data.

In accordance with another aspect of the present disclosure, there is provided a mobile terminal for managing power. The mobile terminal includes a controller configured to determine whether residual power indicative of residual battery power of the mobile terminal is less than or equal to predetermined reference power, if a power management mode is run, and to generate guide data to be provided to a user based on the residual power, if the residual power is less than or equal to the predetermined reference power; and a screen configured to display the guide data.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIGS. 11A to 11C illustrate screens of an example of guide data displayed by a mobile terminal according to still another embodiment of the present disclosure;

FIGS. 12A to 12C illustrate screens of an example of guide data displayed by a mobile terminal according to still another embodiment of the present disclosure;

FIGS. 18A to 18D illustrate screens of an example of running a power management mode by a mobile terminal according to still another embodiment of the present disclosure.

Throughout the drawings, like reference numerals will be understood to refer to like parts, components, and structures.

DETAILED DESCRIPTION OF THE EMBODIMENTS OF THE PRESENT INVENTION

The following description with reference to the accompanying drawings is provided to assist in a comprehensive understanding of embodiments of the disclosure as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
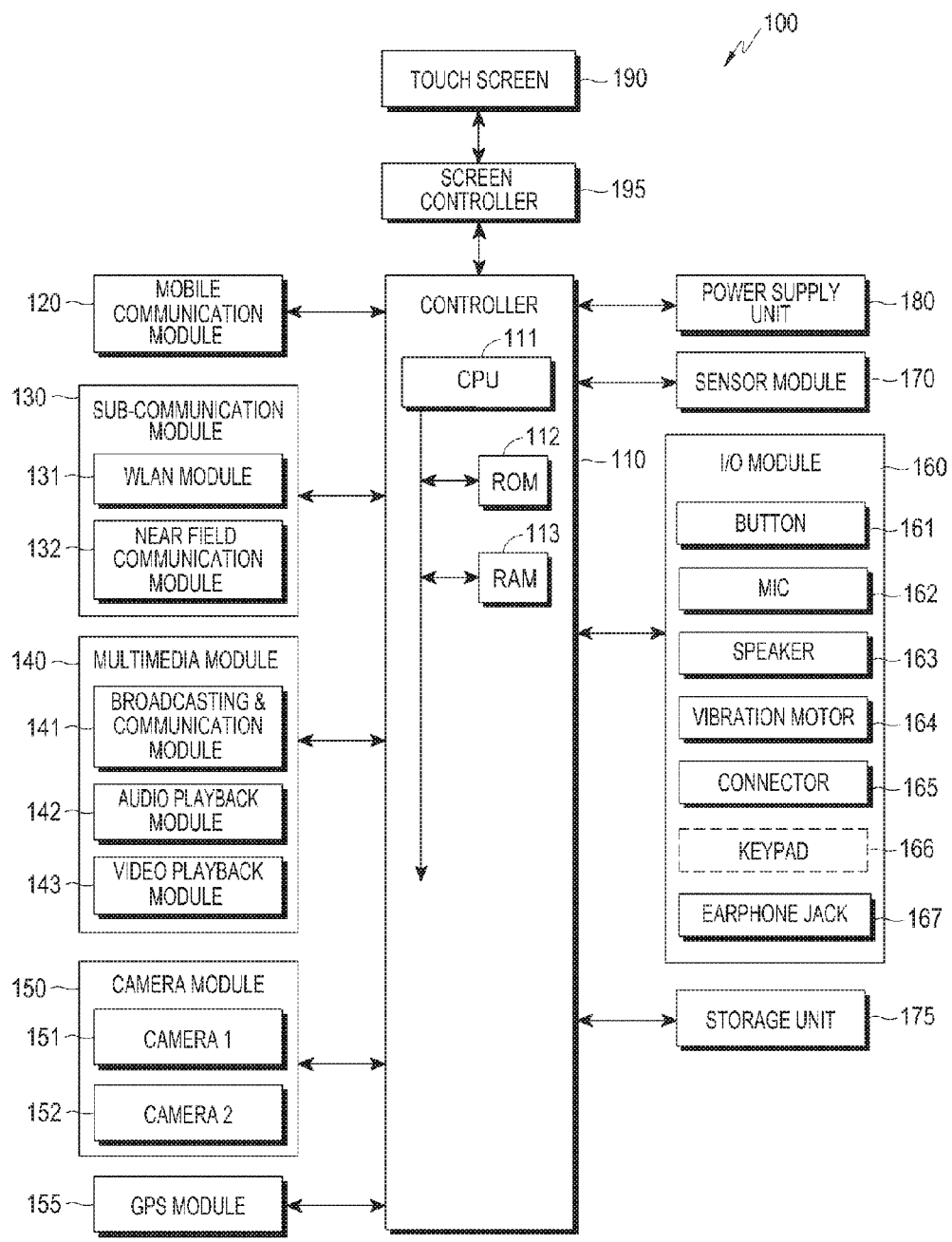
FIG. 1 illustrates a block diagram of a mobile terminal according to an embodiment of the present disclosure.

FIG. 1 illustrates a block diagram of a mobile terminal according to an embodiment of the present disclosure.

Referring to FIG. 1, a mobile terminal 100 includes at least one of a controller 110, a mobile communication module 120, a sub-communication module 130, a multimedia module 140, a camera module 150, a Global Positioning System (GPS) module 155, an Input/Output (I/O) module 160, a sensor module 170, a storage unit 175, a power supply unit 180, a touch screen 190 and a screen controller 195.

The controller 110 controls the operation of the mobile terminal 100. The controller 110 manages the power of the mobile terminal 100 by running a power management mode. The power management mode refers to an operation mode in which the controller 110 manages the power of the mobile terminal 100 by performing an operation of terminating the execution of a specific application being executed, or terminating the execution of a specific module (e.g., turning off or switching off a specific module).

If the power management mode is run or enabled, the controller 110 checks the execution/non-execution of each of a plurality of applications and modules installed in the mobile terminal 100. According to an embodiment of the present disclosure, the controller 110 may check the execution/non-execution of each of the applications or modules before running the power management mode. The controller 110 determines the pattern that the user uses the mobile terminal 100, depending on the number of executions, the execution time, the user preference, the power consumption and the like, for each of the applications and modules. The controller 110 manages the power of the mobile terminal 100 so that the mobile terminal 100 may operate according to the user pattern.

The controller 110 generates guide data in order to operate the mobile terminal 100 according to the user pattern. Using the guide data, the controller 110 guides the user to an operation of saving the power of the mobile terminal 100. The controller 110 may guide or let the user to determine whether to execute the operation of saving the power of the mobile terminal 100, using the guide data.

The controller 110 includes a Central Processing Unit (CPU) 111, a Read Only Memory (ROM) 112 storing a control program for control of the mobile terminal 100, and a Random Access Memory (RAM) 113 that temporarily stores the signals or data received from the outside of the mobile terminal 100, or is used as a workspace for operations performed in the mobile terminal 100. The CPU 111 may include a single-core CPU, a dual-core CPU, a triple-core CPU, a quad-core CPU or the like. The CPU 111, the ROM 112 and the RAM 113 may be interconnected via an internal bus.

The controller 110 controls the mobile communication module 120, the sub-communication module 130, the multimedia module 140, the camera module 150, the GPS module 155, the I/O module 160, the sensor module 170, the storage unit 175, the power supply unit 180, the touch screen 190 and the screen controller 195.

The controller 110 controls the touch screen 190, thereby to control a variety of content being displayed on the touch screen 190 or to control the display of the content. The controller 110 controls the mobile terminal 100 so that the mobile terminal 100 may perform an operation corresponding to a touch input (e.g., a user input) detected by the touch screen 190. Upon receiving a touch input that is made as the user touches at least one point on the touch screen 190, the controller 110 controls the mobile terminal 100 so that the mobile terminal 100 may perform an operation corresponding to the touch input.

The mobile communication module 120, under control of the controller 110, connects the mobile terminal 100 to external devices using at least one antenna. The mobile terminal 100 may be connected to the external devices through mobile communication. The mobile communication module 120 transmits and receives wireless signals for voice calls, video calls, Short Message Service (SMS) messages, or Multimedia Messaging Service (MMS) messages, to/from cellular phones, smart phones, tablet Personal Computers (PCs), or other devices, phone numbers of all of which are entered or registered in the mobile terminal 100.

The sub-communication module 130 includes at least one of a Wireless Local Area Network (WLAN) module 131 and a short-range communication module 132. The multimedia module 140 includes at least one of a broadcasting and communication module 141, an audio playback module 142 and a video playback module 143. The camera module 150 includes at least one of a first camera 151 and a second camera 152. The I/O module 160 includes at least one of a button(s) 161, a microphone (MIC) 162, a speaker (SPK) 163, a vibration motor 164, a connector 165, a keypad 166 and an earphone jack 167.

The WLAN module 131, under control of the controller 110, may be connected to the Internet in the place where a wireless Access Point (AP) is installed. In other words, the WLAN module 131 supports the wireless connection of the mobile terminal 100 to the Internet. The WLAN module 131 may support the WLAN standard IEEE802.11x proposed by the Institute of Electrical and Electronics Engineers (IEEE). The short-range communication module 132, under control of the controller 110, may wirelessly perform short-range communication between the mobile terminal 100 and an image forming apparatus. The short-range communication scheme may include Bluetooth, Infrared Data Association (IrDA). WiFi-Direct, Near Field Communication (NFC), and the like.

The mobile terminal 100 includes at least one of the mobile communication module 120, the WLAN module 131 and the short-range communication module 132 depending on its performance. For example, the mobile terminal 100 may include a combination of the mobile communication module 120, the WLAN module 131 and the short-range communication module 132 depending on its performance.

The multimedia module 140 includes the broadcasting and communication module 141, the audio playback module 142, or the video playback module 143. The broadcasting and communication module 141, under control of the controller 110, receives broadcast signals (e.g., TV broadcast signals, radio broadcast signals, data broadcast signals or the like) and additional broadcast information (e.g., Electric Program Guide (EPG), Electric Service Guide (ESG) or the like) transmitted from the broadcasting stations through a broadcasting and communication antenna. According to an embodiment of the present disclosure, the broadcasting and communication module 141 outputs the content data received through the mobile communication module 120 to the touch screen 190. The audio playback module 142, under control of the controller 110, plays the digital audio files (with a file extension of, for example, mp3, wma, ogg or way), which are stored in the mobile terminal 100 or received from the outside. The video playback module 143, under control of the controller 110, plays the digital video files (with a file extension of, for example, mpeg, mpg, mp4, avi, mov or mkv), which are stored in the mobile terminal 100 or received from the outside. The video playback module 143 may play the digital audio files as well.

The multimedia module 140 may include the audio playback module 142 and the video playback module 143, without the broadcasting and communication module 141. The audio playback module 142 or the video playback module 143 in the multimedia module 140 may be incorporated into the controller 110.

The camera module 150 includes at least one of the first camera 151 and the second camera 152, which capture or shoot still images or videos under control of the controller 110. The first camera 151 or the second camera 152 may include an auxiliary light source (e.g., a flash) that provides the light needed for shooting. The first camera 151 may be disposed on the front of the mobile terminal 100, and the second camera 152 may be disposed on the rear of the mobile terminal 100. In an alternative embodiment, the first camera 151 and the second camera 152 may be disposed on the same side to be adjacent to each other (with a gap set between 1 cm and 8 cm) to capture Three-Dimensional (3D) images or videos.

The GPS module 155 receives radio waves from a plurality of GPS satellites in the Earth's orbit, and calculates the location of the mobile terminal 100 using Time of Arrival (ToA) from the GPS satellites to the mobile terminal 100.

The I/O module 160 includes at least one of the multiple buttons 161, the microphone 162, the speaker 163, the vibration motor 164, the connector 165, the keypad 166, and the earphone jack 167.

The buttons 161 may be formed on the front, side or rear of the housing of the mobile terminal 100, and may include at least one of a Power/Lock button, a Volume button, a Menu button, a Home button, a Back button, and a Search button.

The microphone 162, under control of the controller 110, generates an electrical signal by receiving or picking up voice or sound.

The speaker 163, under control of the controller 110, outputs the sounds corresponding to various signals (e.g., wireless signals, broadcast signals, digital audio files, digital video files, photo shooting tones or the like) from the mobile communication module 120, the sub-communication module 130, the multimedia module 140 or the camera module 150, to the outside of the mobile terminal 100. The speaker 163 outputs the sounds (e.g., button manipulation tones for calls, ring back tones or the like) corresponding to the function performed by the mobile terminal 100. One or multiple speakers 163 may be formed in a proper position or positions of the housing of the mobile terminal 100.

The vibration motor 164, under control of the controller 110, converts an electrical signal into mechanical vibrations. For example, upon receiving a voice call from another device, the mobile terminal 100 in a vibration mode may activate or enable the vibration motor 164. One or multiple vibration motors 164 may be formed in the housing of the mobile terminal 100. The vibration motor 164 may operate in response to a user's touch action made on the touch screen 190, and/or a continuous movement of a touch on the screen 190.

The connector 165 is used as an interface for connecting the mobile terminal 100 to external devices or power sources. The mobile terminal 100, under control of the controller 110, transmits the data stored in its storage unit 175 to the external devices, or receives data from the external devices, through a wired cable connected to the connector 165. According to an embodiment of the present disclosure, the mobile terminal 100 receives power from a power source or charges its rechargeable battery using the power source, through a wired cable connected to the connector 165. The power supply unit 180 according to an embodiment of the present disclosure supplies the power received through the connector 165 to each of the modules in the mobile terminal 100, which are illustrated in FIG. 1, so the mobile terminal 100 may be powered with the power that is received in real time through the connector 165. The power supply unit 180 charges the battery by supplying the power received through the connector 165, to the battery. The power supply unit 180, under control of the controller 110, may interrupt the supply of power to at least one of the modules in the mobile terminal 100.

The keypad 166 receives key inputs from the user, for control of the mobile terminal 100. The keypad 166 may include a physical keypad formed on the mobile terminal 100, and/or a virtual keypad displayed on the screen 190.

The physical keypad formed on the mobile terminal 100 may be optional depending on the performance or structure of the mobile terminal 100.

An earphone may be inserted into the earphone jack 167 and connected to the mobile terminal 100.

The sensor module 170 includes at least one sensor for detecting a state of the mobile terminal 100. For example, the sensor module 170 may include a proximity sensor for detecting the user's proximity to the mobile terminal 100, an illuminance sensor for detecting the amount of light around the mobile terminal 100, a motion sensor for detecting the motion (e.g., rotation, acceleration, vibration or the like) of the mobile terminal 100, a geo-magnetic sensor for detecting the point of the compass using the Earth's magnetic field, a gravity sensor for detecting a direction of gravity, and an altimeter for detecting the altitude by measuring the atmospheric pressure. At least one of the sensors may detect a state of the mobile terminal 100, generate a signal corresponding to the detection, and transmit the signal to the controller 110. The sensors may be added or removed to/from the sensor module 170 depending on the performance of the mobile terminal 100.

The sensor module 170 according to an embodiment of the present disclosure may include a proximity sensor that detects the user's movement (e.g., movement of the user's fingers) on or over the screen 190. For example, if the screen 190 is implemented in a capacitive way, the sensor module 170 implemented as a proximity sensor may detect the user's movement by detecting a change in capacitance, which occurs within a specific range over the screen 190 (e.g., at a height of 10 cm over the screen 190). The detected user's movement may also be included in the user input.

The storage unit 175, under control of the controller 110, stores the signals or data that are input and output to correspond to operations of the mobile communication module 120, the sub-communication module 130, the multimedia module 140, the camera module 150, the GPS module 155, the I/O module 160, the sensor module 170, and the screen 190. The storage unit 175 stores a control program for control of the mobile terminal 100 or the controller 110, and a variety of executable applications or modules.

The term 'storage unit' as used herein may be construed to include the storage unit 175, the ROM 112 and RAM 113 in the controller 110, or a memory card (e.g., a secure Digital (SD) card, a memory stick or the like) mounted in the mobile terminal 100. The storage unit 175 may include a non-volatile memory, a volatile memory, a Hard Disk Drive (HDD), or a Solid State Drive (SSD).

The power supply unit 180, under control of the controller 110, supplies the power to one or multiple batteries mounted in the housing of the mobile terminal 100. The one or multiple batteries may supply power to the mobile terminal 100. The power supply unit 180 supplies, to the mobile terminal 100, the power that is received from the external power source through a wired cable connected to the connector 165. The power supply unit 180 supplies, to the mobile terminal 100, the power that is wirelessly received from the external power source by wireless charging technology.

The touch screen 190 displays the data stored in the mobile terminal 100. According to an embodiment of the present disclosure, the touch screen 190 receives, from the user, the user input (or touch input) which occurs as the user touches the touch screen 190 with a part (e.g., finger) of his/her body. The touch screen 190 provides user interfaces corresponding to a variety of services (e.g., call, data transfer, broadcasting, photo-shooting and the like), for the user. The touch screen 190 transmits an analog signal (or a touch input) corresponding to at least one touch input to the user interface, to the screen controller 195. The touch screen 190 receives at least one touch input made by the user's body (e.g., fingers) or a touch input means (e.g., a stylus pen). The touch screen 190 receives a continuous movement of at least one of touches, and transmits an analog signal corresponding to the continuous movement of a touch input to the screen controller 195.

The term 'touch' is not limited to the direct contact between the screen 190 and the user's body or the touch input means, but may include indirect contact (e.g., non-contact) between the screen 190 and the user's body or the touch input means, with a detectable gap set to 1 mm or less. The detectable gap between the screen 190 and the user's body or the touch input means may be subject to change depending on the performance or structure of the mobile terminal 100.

The screen 190 may be implemented in, for example, a resistive type, a capacitive type, an infrared type or an acoustic wave type.

The screen controller 195 converts an analog signal received from the touch screen 190 into a digital signal (e.g., X and Y coordinates), and transmits the digital signal to the controller 110. The controller 110 controls the touch screen 190 using the digital signal received from the screen controller 195. For example, the controller 110 may select or execute a shortcut icon displayed on the touch screen 190 in response to a touch. The screen controller 195 may be implemented to be incorporated into the controller 110.

According to an embodiment of the present disclosure, the screen controller 195 extracts the coordinates on the screen 190, which correspond to the proximity sensing input detected by the sensor module 170. For example, a proximity sensing input for selecting one point (a first point) within a specific range over the touch screen 190 is assumed to be detected by the sensor module 170. In addition, the proximity sensing input is assumed to be implemented in a capacitive way. In this case, the sensor module 170 may detect a change in capacitance, which occurs within a specific range over the touch screen 190, and the controller 110 may control the screen controller 195 to extract the coordinates of a point (or a second point) on the touch screen 190, which corresponds to the point (or the first point) where the capacitance is changed. For example, the second point may be one point on the touch screen 190, which is closest to the first point.

According to an embodiment of the present disclosure, the mobile terminal 100 may be connected to external devices using external device connectors such as the sub-communication module 130, the connector 165, earphone jack 167 and the like.

The external devices may include various devices such as earphones, external speakers, Universal Serial Bus (USB) memories, chargers, cradles/docks, Digital Multimedia Broadcasting (DMB) antennas, mobile payment devices, healthcare devices (e.g., blood glucose meters and the like), game consoles, car navigation devices, and the like, all of which may be detachably connected to the mobile terminal 100 by wires. The external devices may include short-range communication devices such as Bluetooth devices, NFC devices, WiFi Direct devices, wireless APs and the like, all of which may be wirelessly connected to the mobile terminal 100 by short-range communication. The external devices may also include other devices, cellular phones, smart phones, tablet PCs, desktop PCs, servers and the like.

Figure 2:
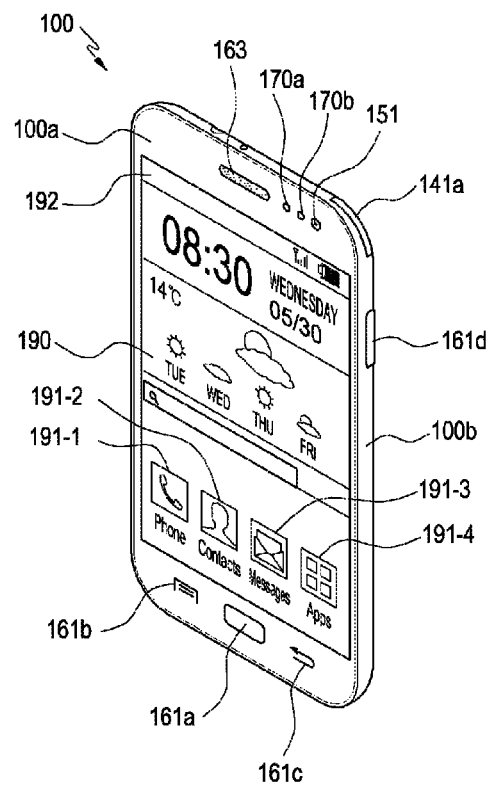
FIG. 2 is a front perspective view of a mobile terminal according to an embodiment of the present disclosure.
Figure 3:
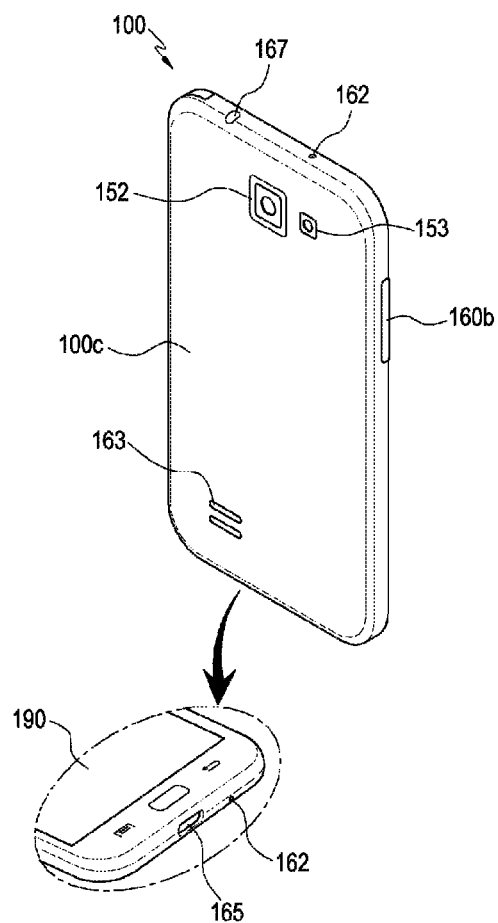
FIG. 3 is a rear perspective view of a mobile terminal according to an embodiment of the present disclosure.

FIG. 2 is a front perspective view of a mobile terminal according to an embodiment of the present disclosure, and FIG. 3 is a rear perspective view of a mobile terminal according to an embodiment of the present disclosure.

Referring to FIG. 2, the touch screen 190 may be disposed in the center of a front 100a of the mobile terminal 100. The screen 190 may be large enough to occupy most of the front 100a of the mobile terminal 100.

In the example of FIG. 2, a main home screen is displayed on the screen 190. The main home screen may be the first screen that is displayed on the screen 190 when the mobile terminal 100 is powered on. If the mobile terminal 100 has different home screens of several pages, the main home screen may be the first home screen among the home screens of several pages. On the home screen may be displayed shortcut icons 191-1, 191-2 and 191-3 for executing frequently-used applications or modules, a Switch-to-Main Menu icon (or Apps icon) 191-4, the time, the weather, and the like. The Switch-to-Main Menu icon 191-4 may be used to display a menu screen on the screen 190. On the top of the screen 190 may be displayed a status bar 192 indicating states of the mobile terminal 100, such as the battery level, received signal strength, the current time and the like.

Under the screen 190 may be formed a Home button 161a, a Menu button 161b, and a Back button 161c. The Home button 161a is used to display the main home screen on the screen 190. For example, if the Home button 161a is touched while any home screen different from the main home screen, or a menu screen is displayed on the screen 190, the main home screen is displayed on the screen 190. If the Home button 191a is touched while applications or modules are executed on the screen 190, the main home screen illustrated in FIG. 2 is displayed on the screen 190. The Home button 161a may also be used to display recently used applications or modules on the screen 190, or to display a task manager.

The Menu button 161b provides connection menus that can be used on the screen 190. The connection menus may include an Add Widget menu, a Change Wallpaper menu, a Search menu, an Edit menu, a Preferences menu and the like.

The Back button 161c is used to display the previous screen preceding the current screen, or to terminate at least one of the most recently used at least one application or module.

On an edge of the front 100a of the mobile terminal 100 may be disposed the first camera 151, an illuminance sensor 170a and a proximity sensor 170b. On a rear 100c of the mobile terminal 100 may be disposed the second camera 152, a flash 153, and the speaker 163.

On sides 100b of the mobile terminal 100 may be disposed, for example, a Power/Reset button 161d, a Volume button, a terrestrial DMB antenna 141a for broadcast reception, one or multiple microphones 162, and the like. The DMB antenna 141a may be detachably fixed to the mobile terminal 100.

The connector 165 may be formed in the bottom side of the mobile terminal 100. A plurality of electrodes may be formed in the connector 165 and may be connected to the external devices by wires. The earphone jack 167 may be formed in the top side of the mobile terminal 100. An earphone may be inserted in the earphone jack 167.

Figure 4:
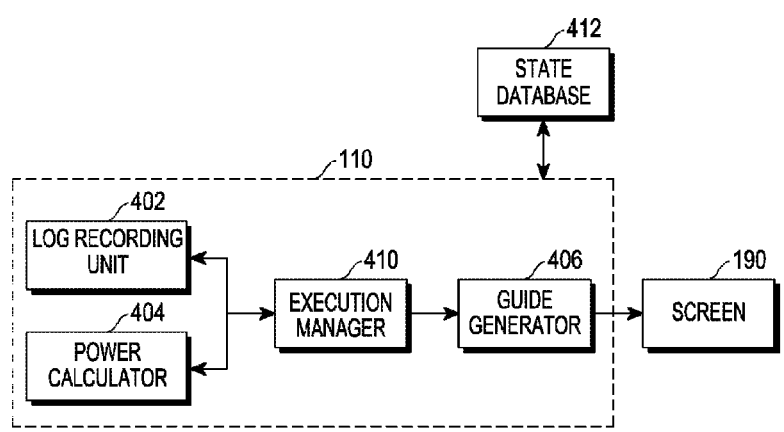
FIG. 4 illustrates a block diagram of a controller in a mobile terminal according to an embodiment of the present disclosure.

FIG. 4 illustrates a block diagram of a controller in a mobile terminal according to an embodiment of the present disclosure.

Referring to FIG. 4, the controller 110 includes a log recording unit 402, a power calculator 404, a guide generator 406 and an execution manager 410.

The log recording unit 402 checks the number of executions, the execution time and the like, as a log for each of applications and modules installed in the mobile terminal 100. The number of executions indicates the number of executions performed by each of the applications and the modules, and the execution time indicates the time for which each of the applications and the modules is executed. According to an embodiment of the present disclosure, the log recording unit 402, under control of the controller 110, checks in real time the number of executions or the execution time, for each of the applications and the modules. The log recording unit 402 checks the current power (e.g., the residual power) of a battery that is embedded in the mobile terminal 100 or detachably mounted in the mobile terminal 100, at intervals of a predetermined time (e.g., 5 minutes) registered in the storage unit 175. The log recording unit 402 may record the log in a state database 412 under control of the controller 110. According to an embodiment of the present disclosure, the state database 412 may be implemented to be incorporated into the storage unit 175.

The power calculator 404 checks the power (or power consumption) that is consumed by each or all of the applications and modules installed in the mobile terminal 100, based on the logs recorded by the log recording unit 402. The power calculator 404 calculates the power (or required power) that is required to execute at least one application or module. For example, it will be assumed that the user desires to use or enjoy an application A for four hours. The power calculator 404 calculates the required power needed to drive or enable the application A for four hours. The power calculator 404 calculates the power that is reduced (or reduced power) when the execution or operation of at least one application is terminated or when at least one module is turned off. According to an embodiment of the present disclosure, the power calculator 404 may calculate the required power needed to operate the mobile terminal 100 depending on a user pattern.

The guide generator 406 generates guide data. The guide generator 406 generates guide data that includes an image, a text, an avatar, a speech bubble, a pop-up message, a widget or an animation. If the guide data is generated, the screen 190 displays the guide data.

The execution manager 410 controls the overall operation of the mobile terminal 100 that runs the power management mode.

The execution manager 410 determines the pattern (e.g., user pattern) that the user uses the mobile terminal 100, by analyzing the log for each or all of the applications and the modules. It will be assumed that, for example, the user of the mobile terminal 100 has enjoyed a first application in the mobile terminal 100 for three hours, a second application for two hours and a third application for one hour every 24 hours over three days. The execution manager 410 of the mobile terminal 100 according to an embodiment of the present disclosure may determine, as a user pattern, the record that the user has enjoyed the first to third applications for three hours, two hours and one hour, respectively, during 24 hours as described above. The user pattern may be determined depending on the execution time, the number of executions, the user preferences and the like, for each of the applications and modules used by the user.

For example, the results that the log recording unit 402 has registered that the user has enjoyed various applications and modules installed in the mobile terminal 100 over seven days are assumed to be as follows. The user has executed an application A for 14 hours, an application B for 21 hours, and each of applications C, D and E for 70 minutes, over seven days. The execution manager 410 calculates an average daily record using the log records for seven days. Based thereon, the execution manager 410 determines that the user has executed the application A for two hours, the application B for three hours, and each of the applications C, D and E for 10 minutes on average on a daily basis. The execution manager 410 determines the average daily record as a user pattern.

The execution manager 410 manages the power of the mobile terminal 100 so that the mobile terminal 100 may operate according to the user pattern. The mode in which the execution manager 410 manages the power of the mobile terminal 100 by controlling the mobile terminal 100 will be referred to herein as a 'power management mode'.

The execution manager 410 according to an embodiment of the present disclosure determines whether a user input for running the power management mode is received. If the user input for running the power management mode is received through the I/O module 160 or the touch screen 190, the execution manager 410 controls the mobile terminal 100 to run the power management mode. The execution manager 410 may run the power management mode, if the residual power is less than or equal to reference power. The execution manager 410 may determine the residual power through the log recording unit 402.

The execution manager 410 requests the power calculator 404 to calculate the power (e.g., required power) that is required when the mobile terminal 100 operates according to the user pattern. The execution manager 410 acquires the required power calculated by the power calculator 404, from the power calculator 404. The execution manager 410 determines whether the residual power is greater than or equal to the required power. If the residual power is greater than or equal to the required power, the execution manager 410 does not perform an operation of securing the required power (e.g., an operation of terminating the execution of at least one of applications being executed, an operation of turning off at least one of modules, an operation of adjusting the brightness of the screen 190, an operation of adjusting the volume, and the like). On the other hand, if the residual power is less than the required power, the execution manager 410 controls the mobile terminal 100 to perform the operation of securing the required power.

According to an embodiment of the present disclosure, even if the residual power is greater than or equal to the required power, the execution manager 410 may determine whether to execute the operation of securing the required power. For example, it will be assumed that the mobile terminal 100 is executing all of the applications A, B and C, and the residual power can execute each of the applications A, B and C for four hours. However, the user pattern is assumed to execute each of the applications A and B for five hours. The execution manager 410 may terminate the execution of one of the application, such as the application C, in order to operate the mobile terminal 100 according to the user pattern.

According to an embodiment of the present disclosure, the execution manager 410 performs an operation of securing the required power depending first on the user preferences. In the above example, among the applications A and B which are executed according to the user pattern, the application A is assumed to be higher than the application B in terms of the user preferences (or user rating). In addition, it will be assumed that even though the execution of the application C has been terminated, each of the applications A and B cannot be executed for five hours, and the execution of both of the applications B and C needs to be terminated to execute the application A for five hours. The execution manager 410 may terminate the execution of both of the applications B and C in order to execute the application A having the highest user rating for five hours.

According to an embodiment of the present disclosure, the execution manager 410 performs an operation of securing the required power depending on the user input. For example, it will be assumed that the mobile terminal 100 is now executing the applications A and B, and the user pattern is to execute each of the applications A and B for three hours. In addition, it will be assumed that when the power management mode is run, the mobile terminal 100 is requested by the user to execute the application C for five hours. The execution manager 410 controls the power calculator 404 to calculate the required power (or first power) needed to execute the application C for five hours. Further, the execution manager 410 controls the power calculator 404 to calculate the required power (or second power) needed to execute each of the applications A and B for three hours. According to an embodiment of the present disclosure, the execution manager 410 may controller the power calculator 404 to calculate the required power (or third power) needed to execute the applications A, B and C at the time.

If the third power is greater than or equal to the current power (or the residual power) of the mobile terminal 100, the execution manager 410 controls the mobile terminal 100 to execute all of the applications A, B and C. If the third power is less than the residual power and the residual power is greater than or equal to the first power, the execution manager 410 may terminate the execution of the applications A and B in order to reduce or save the second power.

Upon determining to perform the operation of securing the required power, the execution manager 410 controls the guide generator 406 to generate guide data used to recommend the operation to the user. If the guide data is generated by the guide generator 406, the execution manager 410 controls the screen 190 or the screen controller 195 to display the guide data.

According to an embodiment of the present disclosure, the execution manager 410 updates the user pattern. The execution manager 410 may update the user pattern based on the log recorded by the log recording unit 402. The execution manager 410 may update the user pattern based on the guide data. Further, the execution manager 410 may update the user pattern by reflecting the user input made to determine the operation of securing the required power. The user pattern updated may be stored in the state database 412.

According to an embodiment of the present disclosure, the execution manager 410 determines a plurality of operations of securing the required power. For example, a first operation and a second operation are assumed to be determined as an operation of securing the required power by the execution manager 410. The execution manager 410 controls the guide generator 406 to generate guide data, allowing the user to select any one of the first and second operations. The execution manager 410 may update the user pattern according to the user's selection. For example, if the user selects the first operation, the execution manager 410 updates the user pattern by reflecting the selection in the user pattern.

Figure 5:
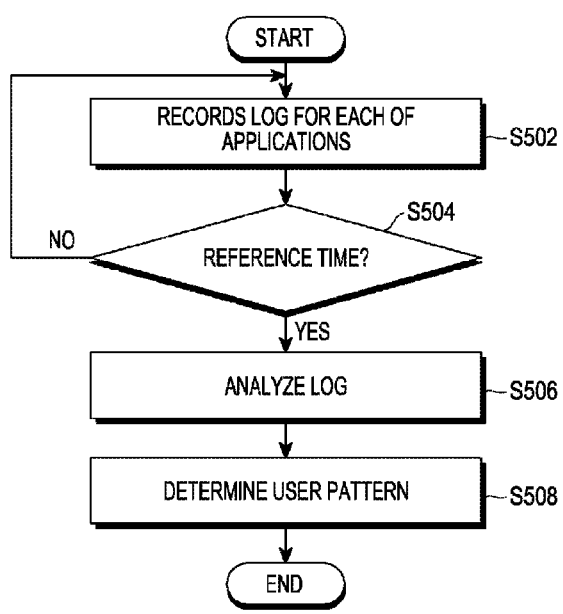
FIG. 5 is a flowchart illustrating an example of a power management method of a mobile terminal according to an embodiment of the present disclosure.

FIG. 5 is a flowchart illustrating an example of a power management method of the mobile terminal illustrated in FIG. 1.

Referring to FIG. 5, the log recording unit 402 of the mobile terminal 100 records logs for each of applications and modules installed in the mobile terminal 100 in step S502. In step S502, the log recording unit 402 may record the number of executions, the execution time, and the like, for each of all the applications and modules installed in the mobile terminal 100. The log recording unit 402 may record logs for each of the applications and modules at intervals of a predetermined time (e.g., 5 minutes).

If the log recording unit 402 records the logs, the execution manager 410 determines whether a reference time has elapsed in step S504. The reference time corresponds to the minimum time for which the logs for each of the applications and modules are recorded to determine the pattern (e.g., user pattern) that the user of the mobile terminal 100 has enjoyed each of the applications and modules. For example, the reference time may be 24 hours.

If it is determined in step S504 that the reference time has not elapsed (No in step S504), the log recording unit 402 returns to step S502 and continues to record the logs.

On the other hand, if it is determined in step S504 that the reference time has elapsed (Yes in step S504), the execution manager 410 analyzes the logs in step S506. In step S506, the execution manager 410 calculates the total number of executions, the total execution time and the like, for each of the applications and modules. Based on the calculation results, the execution manager 410 determines the applications or modules frequently used by the user, the applications or modules preferred by the user, or the like. According to an embodiment of the present disclosure, the power calculator 404 calculates the power consumption for each of the applications and modules.

Based on the log analysis, the execution manager 410 determines the user pattern in step S508. According to an embodiment of the present disclosure, the execution manager 410 may determine a plurality of user patterns.

Figure 6:
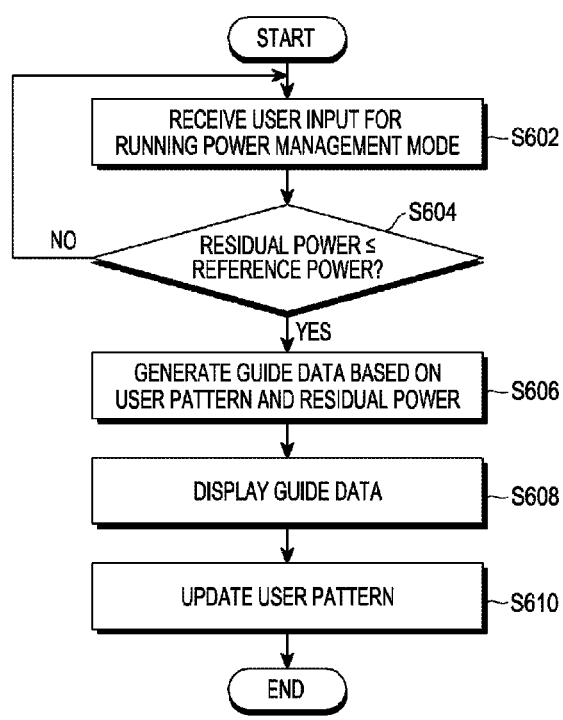
FIG. 6 is a flowchart illustrating another example of a power management method of a mobile terminal according to another embodiment of the present disclosure.

FIG. 6 is a flowchart illustrating another example of a power management method of the mobile terminal illustrated in FIG. 1. It will be assumed in FIG. 6 that the mobile terminal 100 is not running the power management mode, and may run the power management mode only if the residual power is less than or equal to the reference power. In addition, a user pattern is assumed to be stored in advance in the storage unit 175.

Referring to FIG. 6, the mobile terminal 100 receives a user input for running the power management mode in step S602. The user input for running the power management mode may be received from the user through the I/O module 160 or the touch screen 190.

Upon receiving a user input for running the power management mode, the power calculator 404 of the controller 110 determines the residual power of the mobile terminal 100. In this embodiment, the execution manager 410 first determines whether the residual power is less than or equal to reference power in step S604, because the execution manager 410 runs the power management mode only if the residual power of the mobile terminal 100 is less than or equal to the reference power.

If it is determined in step S604 that the residual power exceeds the reference power, the controller 110 may not run the power management mode. According to an embodiment of the present disclosure, the power calculator 404 may determine the residual power at intervals of the time that is stored in advance in the storage unit 175.

If it is determined in step S604 that the residual power is less than or equal to the reference power, the guide generator 406 generates guide data based on the user pattern and the residual power in step S606.

If guide data is generated, the screen 190 displays the guide data in step S608. The execution manager 410 may update the user pattern based on the residual power and the guide data in step S610.

Figure 7A:
FIGS. 7A and 7B illustrate screens of an example of guide data displayed by a mobile terminal according to an embodiment of the present disclosure.
Figure 7B:
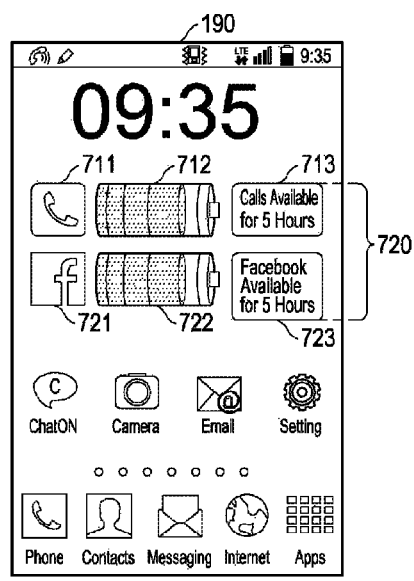

FIGS. 7A and 7B illustrate screens of examples of guide data displayed by the mobile terminal illustrated in FIG. 1. Specifically, FIGS. 7A and 7B both illustrate the touch screen 190 displaying the guide data.

Referring to FIG. 7A, the screen 190, which is displaying the home screen, displays on the home screen guide data 710 including an avatar 702 and a speech bubble 704. The guide generator 406 generates, as the guide data 710, at least one of a variety of content including not only the avatar 702 and the speech bubble 704 illustrated in FIG. 7A, but also a widget and a User Experience (UX). In FIG. 7A, the guide generator 406 is assumed to generate only the avatar 702 and the speech bubble 704, as the guide data 710. In addition, it will be assumed in FIG. 7A that the residual power of the mobile terminal 100 is less than or equal to the reference power. Further, it will be assumed that the user of the mobile terminal 100 desires to enjoy a Call application for performing a call function among the applications and modules which may be executed by the mobile terminal 100, for three hours from now on.

The power calculator 404 calculates the required power needed to execute a call for three hours. Based on the required power, the execution manager 410 may determine at least one application or module, the execution of which the execution manager 410 will stop. In FIG. 7A, the execution manager 410 may determine a WiFi module and a GPS module as the modules, the execution of which the execution manager 410 will stop. The guide generator 406 generates the guide data 710 for requesting the stop of the execution of the WiFi module and the GPS module. The guide generator 406 may generate, as the guide data 710, at least one of a variety of content including not only the avatar 702 and the speech bubble 704 illustrated in FIG. 7A, but also a pop-up message, a widget and a UX. It will be assumed in FIG. 7A that the guide generator 406 generates the avatar 702 and the speech bubble 704 as the guide data 710. In order to request the user to stop the execution of the WiFi module and the GPS module, the guide generator 406 may include or insert a sentence 'Turn off WiFi and GPS for 3-Hour Use of Calls' in the speech bubble 704.

The controller 110 controls the screen 190 to display the guide data 710 including the avatar 702 and the speech bubble 704 on the home screen, guiding or allowing the user to manage the power of the mobile terminal 100.

Although the guide data 710 is implemented in the form of the avatar 702 and the speech bubble 704 in this embodiment, the guide data 710 may be implemented in the form of a pop-up message, a widget or the like, and displayed on the screen 190 according to another embodiment.

According to another embodiment of the present disclosure, it will be assumed in FIG. 7A that the user of the mobile terminal 100 desires to first enjoy a Call application among the applications and modules that can be executed by the mobile terminal 100, for three hours from now on. In other words, the user may enjoy a Call application and another application and module other than the Call application, for three hours from now on.

The power calculator 404 calculates the required power needed to first execute the Call application. For example, the power calculator 404 may calculate, as the required power, the power needed to execute the Call application, an Application A, an application B and a module C, for three hours from now on.

Based on the required power, the execution manager 410 determines the application(s), the execution of which the execution manager 410 will stop. In FIG. 7A, the execution manager 410 may determine a WiFi module and a GPS module as the modules, the execution of which the execution manager 410 will stop. Based thereon, the guide generator 406 generates the guide data 710 for requesting the stop of the execution of the WiFi module and the GPS module. The screen 190, under control of the controller 110, displays the guide data 710 as illustrated in FIG. 7A.

FIG. 7B illustrates the screen 190 on which the mobile terminal 100 displays guide data 720 including the available execution times determined by the residual power, for the applications and modules. It will be assumed in FIG. 7B that the user requests the mobile terminal 100 to display the available execution time for each of Call and Facebook™ applications, for the residual power.

According to another embodiment of the present disclosure, if the residual power is less than or equal to the reference power, the controller 110 controls the mobile terminal 100 to generate the guide data 720 including the available execution time for the application or module which is frequently used by the user, and to display the generated guide data 720 on the screen 190. It will be assumed in FIG. 7B that the application frequently used by the user includes a Call application and a Facebook™ application.

The power calculator 404 calculates the available execution time for each of the applications and modules, using the current residual power. For example, the power calculator 404 may calculate the available execution time (e.g., five hours) for each of the Call and Facebook™ applications. The guide generator 406 may generate the guide data 720 that includes icons 711 and 721, battery images 712 and 722, and texts 713 and 723 indicating the available execution time, which correspond to the Call and Facebook™ applications, respectively. Since the Call and Facebook™ applications both can be executed for five hours, the text 713 may include the comment 'Calls Available for 5 Hours' and the text 723 may include the comment 'Facebook™ Available for 5 Hours'.

The screen 190, as illustrated in FIG. 7B, displays the guide data 720 by displaying the icon 711, the battery image 712 and the text 713 for the Call application above the icon 721, the battery image 722 and the text 723 for the Facebook™ application, respectively.

Figure 8A:
FIGS. 8A and 8B illustrate screens of an example of guide data displayed by a mobile terminal according to another embodiment of the present disclosure.
Figure 8B:
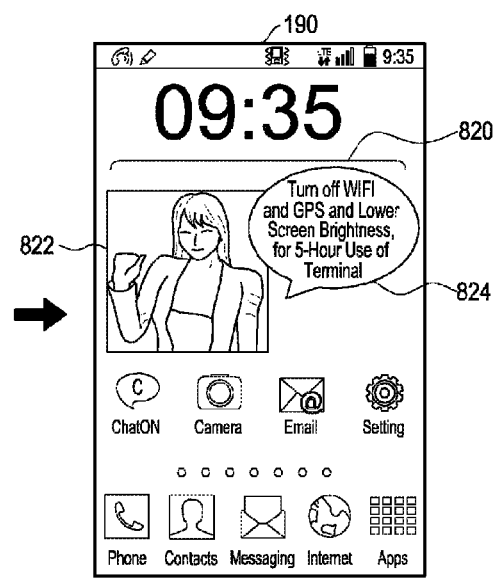

FIGS. 8A and 8B illustrate screens of another example of guide data displayed by the mobile terminal illustrated in FIG. 1.

Specifically, FIG. 8A illustrates the screen 190 through which the mobile terminal 100 receives the desired total use time from the user, and FIG. 8B illustrates the screen 190 that displays guide data 820 generated in response to the total use time in FIG. 8A.

Referring to FIG. 8A, the screen 190 of the mobile terminal 100 receives the total use time desired by the user, from the user through an input window 810. In FIG. 8A, the user may input, as the total use time, five hours (e.g., '05:00') to the mobile terminal 100.

The power calculator 404 determines the residual power. Based on the residual power, the execution manager 410 determines at least one application or module, the execution of which the execution manager 410 should stop, in order to run the mobile terminal 100 for a total of five hours.

According to an embodiment of the present disclosure, the execution manager 410 determines the application or module that can or should be executed, in order to run the mobile terminal 100 for a total of five hours.

In this embodiment, the execution manager 410 may determine the WiFi module and the GPS module as the modules, the execution of which the execution manager 410 will stop. The execution manager 410 may determine to lower the brightness of the screen 190 in order to save the power consumption of the mobile terminal 100. The guide generator 406 generates the guide data 820 for requesting the user to stop the execution of the WiFi module and the GPS module and to lower the brightness of the screen 190. The guide generator 406 may generate, as the guide data 820, at least one of a variety of content including not only an avatar 822 and a speech bubble 824 illustrated in FIG. 8B, but also a pop-up message, a widget and a UX. It will be assumed in FIG. 8B that the guide generator 406 generates the avatar 822 and the speech bubble 824 as the guide data 820. In FIG. 8B, the guide generator 406 may include or insert a text "Turn off WiFi and GPS and Lower Screen Brightness for 5-Hour Use of Terminal" in the speech bubble 824.

The screen 190 displays the guide data 820 including the avatar 822 and the speech bubble 824, requesting the user to turn off the WiFi module and the GPS module and to lower the brightness of the screen 190.

Although the guide data 820 is implemented in the form of the avatar 822 and the speech bubble 824 in this embodiment, the guide data 820 may be implemented in the form of a pop-up message, a widget or the like, and displayed on the screen 190 according to another embodiment of the present disclosure.

Figures 9A, 9B:
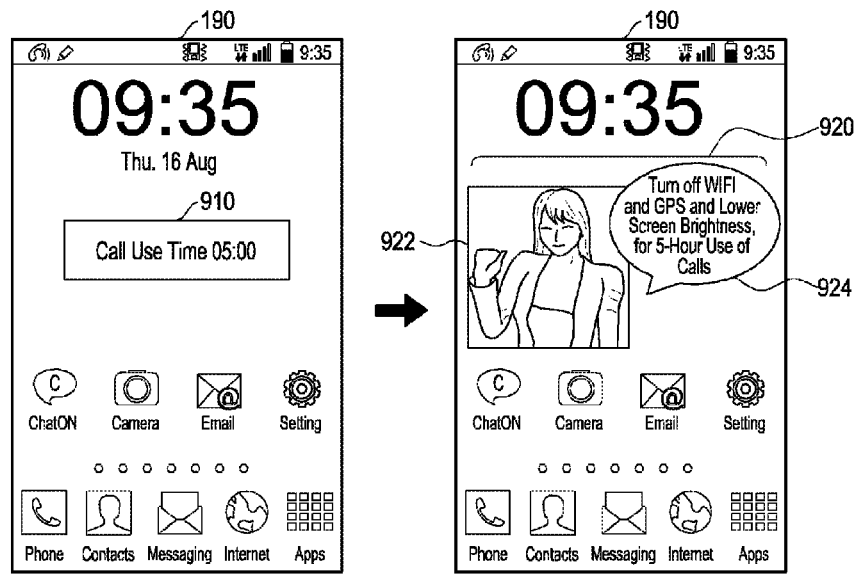
FIGS. 9A and 9B illustrate screens of an example of guide data displayed by a mobile terminal according to further another embodiment of the present disclosure.

FIGS. 9A and 9B illustrate screens of another example of guide data displayed by the mobile terminal illustrated in FIG. 1.

Specifically, FIG. 9A illustrates the screen 190 through which the mobile terminal 100 receives the desired Call use time from the user, and FIG. 9B illustrates the screen 190 that displays guide data 920 generated in response to the Call use time in FIG. 9A.

Referring to FIG. 9A, the screen 190 of the mobile terminal 100 receives the Call use time desired by the user, through an input window 910 from the user. In FIG. 9A, the user may input, as the Call use time, five hours (e.g., '05:00') to the mobile terminal 100.

The power calculator 404 determines the residual power. Based on the residual power, the execution manager 410 determines at least one application or module, the execution of which the execution manager 410 should stop, in order to execute the Call application for five hours.

In this embodiment, the execution manager 410 may determine the WiFi module and the GPS module as the module, the execution of which the execution manager 410 will stop. The execution manager 410 may determine to lower the brightness of the screen 190 in order to save the power consumption of the mobile terminal 100. The guide generator 406 generates the guide data 920 for requesting the user to stop the execution of the WiFi module and the GPS module and to lower the brightness of the screen 190. The guide generator 406 may generate, as the guide data 920, at least one of a variety of content including not only an avatar 922 and a speech bubble 924 illustrated in FIG. 9B, but also a pop-up message, a widget and a UX. It will be assumed in FIG. 9B that the guide generator 406 generates only the avatar 922 and the speech bubble 924 as the guide data 920.

In FIG. 9B, the guide generator 406 may include or insert a text "Turn off WiFi and GPS and Lower Screen Brightness for 5-Hour Use of Calls" in the speech bubble 924.

The screen 190 displays the guide data 920 including the avatar 922 and the speech bubble 924, requesting the user to turn off the WiFi module and the GPS module and to lower the brightness of the screen 190.

Although the guide data 920 is implemented in the form of the avatar 922 and the speech bubble 924 in this embodiment, the guide data 920 may be implemented in the form of a pop-up message, a widget or the like, and displayed on the screen 190 according to another embodiment of the present disclosure.

Figure 10A:
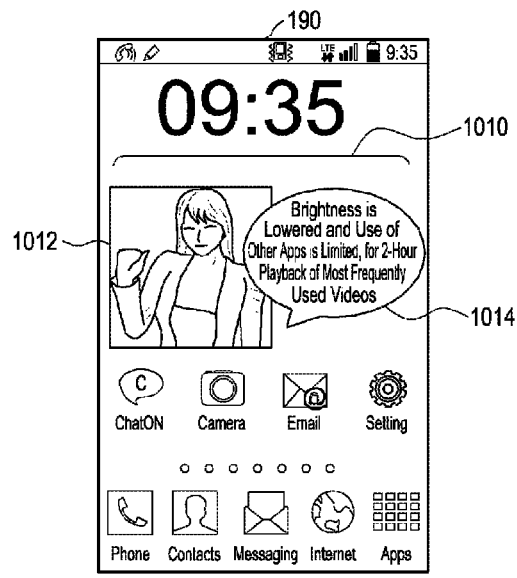
FIGS. 10A and 10B illustrate screens of an example of guide data displayed by a mobile terminal according to yet another embodiment of the present disclosure.
Figure 10B:
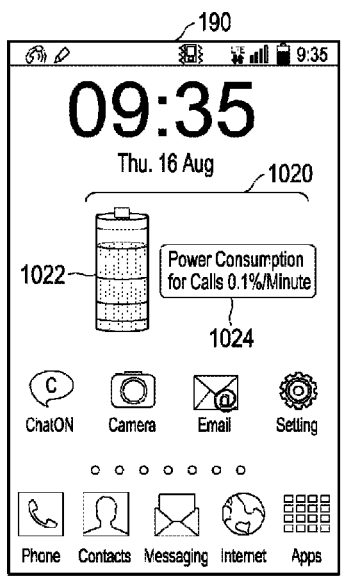

FIGS. 10A and 10B illustrate screens of another example of guide data displayed by the mobile terminal illustrated in FIG. 1.

Referring to FIG. 10A, the screen 190 may display guide data 1010 including an avatar 1012 and a speech bubble 1014. It will be assumed in FIG. 10A that the user frequently uses or enjoys the application (e.g., the video playback module 143) that plays video, among the applications and modules installed in the mobile terminal 100. In addition, the user is assumed to desire to play video for two hours using the video playback module 143.

The power calculator 404 determines the residual power. Based on the residual power, the execution manager 410 determines at least one application or module, the execution of which the execution manager 410 will stop or limit, in order to play video for five hours.

In this embodiment, the execution manager 410 may determine to limit the execution of other applications or modules except for the video playback module 143. The execution manager 410 may determine to lower the brightness of the screen 190 in order to save the power consumption of the mobile terminal 100. The guide generator 406 generates the guide data 1010 for requesting the user to limit the use of other applications or modules, and to lower the brightness of the screen 190. The guide generator 406 may generate, as the guide data 1010, at least one of a variety of content including not only the avatar 1012 and the speech bubble 1014 illustrated in FIG. 10A, but also a pop-up message, a widget and a UX. It will be assumed in FIG. 10A that the guide generator 406 generates only the avatar 1022 and the speech bubble 1014 as the guide data 1010. In FIG. 10A, the guide generator 406 may include or insert a text "Brightness is Lowered and Use of Other Apps is Limited for 2-Hour Playback of Most Frequently Used Videos" in the speech bubble 1014.

The controller 110 displays on the screen 190 the guide data 1010 including the avatar 1012 and the speech bubble 1014 illustrated in FIG. 10A, recommending the user to manage the power of the mobile terminal 100.

Although the guide data 1010 is implemented in the form of the avatar 1012 and the speech bubble 1014 in this embodiment, the guide data 1010 may be implemented in the form of a pop-up message, a widget or the like, and displayed on the screen 190 according to another embodiment of the present disclosure.

FIG. 10B illustrates the screen 190 that displays on the home screen the guide data indicating the time-based power that is consumed to execute at least one of the applications and modules installed in the mobile terminal 100.

In this embodiment, the power calculator 404 calculates the power consumption (e.g., 0.1%/minutes) consumed to execute at least one application or module (e.g., a Call application) selected by the user. The guide generator 406 generates guide data 1020 that includes a battery image 1022 indicating the total residual power of the mobile terminal 100 and a text window 1024 in which the power consumption is displayed.

The controller 110 displays on the screen 190 the guide data 1020 including the battery image 1022 and the text window 1024 illustrated in FIG. 10B, informing the user of the residual power of the mobile terminal 100.

FIGS. 11A to 11C illustrate screens of another example of guide data displayed by the mobile terminal illustrated in FIG. 1.

On the status bar 192 of the screen 190 illustrated in FIG. 11A may be displayed a shortcut icon 1110 used for running the power management mode. The mobile terminal 100 according to an embodiment of the present disclosure displays the shortcut icon 1110 on the status bar 192, thereby to inform the user 1100 that the power management mode is being run. The size and shape of the shortcut icon 1110 may be subject to change, and the position where the shortcut icon 1110 is displayed may also be subject to change.

According to another embodiment of the present disclosure, the shortcut icon 1110 may appear in the status bar 192 even when the mobile terminal 100 is not running the power management mode. By displaying the shortcut icon 1110 while the power management mode is not run, the controller 110 informs the user 1100 that the mobile terminal 100 can run the power management mode. The user 1100 requests the mobile terminal 100 to run the power management mode, by applying a user input for selecting the shortcut icon 1110 to the screen 190. In response to the user input, the controller 110 controls the mobile terminal 100 to activate or enable the power management mode.

The power calculator 404 determines the residual power of the mobile terminal 100. Based on the residual power and the user pattern, the execution manager 410 determines at least one application, the execution of which the execution manager 410 will terminate, or at least one module that the execution manager 410 should turn off. Preferably, the execution manager 410 controls the power calculator 404 to calculate the required power that the mobile terminal 100 needs to operate according to the user pattern. Upon calculating the required power, the power calculator 404 determines an operation(s) that the mobile terminal 100 can perform, in order to secure the required power. Referring to FIG. 11B, the execution manager 410 may determine to turn off the WiFi module and clear (or turn off) the applications and modules in the mobile terminal 100, as an operation of securing the required power. The guide generator 406 generates guide data 1120 for inquiring whether the user 1100 will turn off the WiFi module, terminate the execution of the applications and turn off the modules, e.g., whether the user will clear the applications and modules.

FIG. 11B illustrates the first guide data 1120 including an avatar 1122 and a speech bubble 1124. The speech bubble 1124 may include a text "Do You Want to Turn off WiFi and Clear Apps for 3-Hour Use of Calls According to User Pattern". In addition, the speech bubble 1124 may include a Yes button 1132 and a No button 1134, to inquire whether the user 1100 will run the power management mode depending on the determination of the execution manager 410.

If the user 1100 selects the Yes button 1132, the execution manager 410 controls the mobile terminal 100 to turn off the WiFi module and to clear the applications and modules. On the other hand, if the user 1100 selects the No button 1134, the execution manager 410 does not perform the operation of securing the required power.

FIG. 11C illustrates an example of second guide data 1170 that indicates the power that can be saved when the execution of the applications is terminated. As illustrated in FIG. 11C, the guide generator 406 represents the power that can be secured when the execution of each of the applications is terminated or when each of the modules is turned off, using icons 1141, 1151 and 1161, and battery images 1142, 1152 and 1162 for the applications and modules. The guide generator 406 may include or insert, in the guide data 1170, On/Off buttons 1143, 1153 and 1163 used for determining whether to terminate or continue running the execution of each of the applications and modules.

The second guide data 1170 in FIG. 11C may be implemented to include the shortcut icon 1141, the battery image 1142 and the first On/Off button 1143 for the WiFi module; the shortcut icon 1151, the battery image 1152 and the second On/Off button 1153 for the application A; and the shortcut icon 1161, the battery image 1162 and the third On/Off button 1163 for the application B. Using the battery images 1142, 1152 and 1162, the mobile terminal 100 may inform the user 1100 of the power that can be saved, or the available execution times for other applications or modules, by terminating the execution of a specific application or turning off a specific module.

If the WiFi module is turned off (1141), calls can be executed for three hours (3 H Save) (1142). If the execution of the application A is terminated (1151), calls can be executed for two hours (2 H Save) (1152). If the execution of the application B is terminated (1161), calls can be executed for two hours (2 H Save) (1162). The user 1100 applies a user input for selecting at least one of the first to third On/Off buttons 1143, 1153 and 1163, to terminate the execution of the relevant application or to turn off the relevant module.

In the example of FIG. 11C, the user 1100 may apply a user input for selecting at least one of the first to third On/Off buttons 1143, 1153 and 1163, to the mobile terminal 100, to terminate the execution of at least one of the WiFi module, the application A and the application B. For example, if the user 1100 applies a user input for selecting the first On/Off button 1143 and the third On/Off button 1163 to the mobile terminal 100, the mobile terminal 100 turns off the WiFi module and terminate the execution of the application B.

Although the first guide data 1120 is implemented in the form of the avatar 1122 and the speech bubble 1124 in this embodiment, the first guide data 1120 may be implemented in the form of a pop-up message, a widget or the like, and displayed on the screen 190 according to another embodiment of the present disclosure. It can be appreciated from FIGS. 11B and 11C that the guide generator 406 according to an embodiment of the present disclosure may generate the first guide data 1120 and the second guide data 1170, and display the generated guide data on the screen 190, for the user 1100. By displaying the second guide data 1170 as in FIG. 11C, the mobile terminal 100 provides the user 1100 with a variety of ways to save the residual power.

The guide data according to an embodiment of the present disclosure includes the data (such as the avatar 1122 and the speech bubble 1124) used to inform the user 1100 of the residual power of the mobile terminal 100, or of ways to save the residual power. In addition, the guide data, as illustrated in FIG. 11C, includes a settings screen used for changing the settings of the mobile terminal 100, allowing the user 1100 to save the residual power, or include control data for controlling the mobile terminal 100 to display the settings screen. In this embodiment, the second guide data 1170 may correspond to a settings screen used for changing settings of the mobile terminal 100 to save the residual power, and based on the second guide data 1170, the user 1100 may change the settings of the mobile terminal 100.

Like the above second guide data, the guide data according to an embodiment of the present disclosure includes control data for controlling the mobile terminal 100. The guide data includes the control data used to determine whether to keep or terminate the execution of the applications or modules installed in the mobile terminal 100 based on the residual power, and to apply the determination results to the mobile terminal 100. In other words, as for a specific application or module in the mobile terminal 100, its execution may be kept or terminated depending on the guide data. According to an embodiment of the present disclosure, if the power management mode is run, the mobile terminal 100 displays the guide data having the avatar 1122, the speech bubble 1124, and the like on the screen 190, and terminates or limits the execution of the applications or modules depending on the control data included in the guide data.

FIGS. 12A to 12C illustrate screens of another example of guide data displayed by the mobile terminal illustrated in FIG. 1.

On the status bar 192 of the screen 190 illustrated in FIG. 12A a shortcut icon 1210 used for running the power management mode is displayed. The mobile terminal 100 according to an embodiment of the present disclosure displays the shortcut icon 1210 on the status bar 192, thereby to inform the user 1200 that the power management mode is being run.

According to another embodiment of the present disclosure, the shortcut icon 1210 may appear in the status bar 192 even when the mobile terminal 100 is not running the power management mode. By displaying the shortcut icon 1210 while the power management mode is not run, the controller 110 informs the user 1200 that the mobile terminal 100 can run the power management mode. The user 1200 may request the mobile terminal 100 to run the power management mode, by applying a user input for selecting the shortcut icon 1210 to the screen 190. In response to the user input, the controller 110 controls the mobile terminal 100 to activate or enable the power management mode.

The power calculator 404 determines the residual power of the mobile terminal 100. Based on the residual power and the user pattern, the execution manager 410 determines at least one application, the execution of which the execution manager 410 will terminate, or at least one module that the execution manager 410 should turn off. Preferably, the execution manager 410 controls the power calculator 404 to calculate the required power that the mobile terminal 100 needs to operate according to the user pattern. Upon calculating the required power, the power calculator 404 determines an operation(s) that the mobile terminal 100 can perform, in order to secure the required power. Referring to FIG. 12B, the execution manager 410 may determine to terminate the execution of the WiFi module and clear (or turn off) the applications and modules in the mobile terminal 100, as an operation of securing the required power. The guide generator 406 generates guide data 1220 for inquiring whether the user 1200 will terminate the execution of the WiFi module, and clear the applications and modules.

FIG. 12B illustrates the first guide data 1220 including an avatar 1222 and a speech bubble 1224. The speech bubble 1224 may include a text "Do You Want to Turn off WiFi and Clear Apps for 5-Hour Use of Calls According to User Pattern". In addition, the speech bubble 1224 may include a Yes button 1232 and a No button 1234, to inquire whether the user 1200 will run the power management mode depending on the determination of the execution manager 410.

If the user 1200 selects the Yes button 1232, the execution manager 410 controls the mobile terminal 100 to turn off the WiFi module and to clear the applications and modules. On the other hand, if the user 1200 selects the No button 1234, the execution manager 410 does not perform the operation of securing the required power.

FIG. 12C illustrates an example of second guide data 1260 that indicates the power that can be saved when the execution of the applications or modules is terminated. As illustrated in FIG. 12C, the guide generator 406 represents the power that can be secured when the execution of each of the applications and the modules is terminated, using icons 1241, 1242, 1243, 1244, 1245, 1246 and 1247, which correspond to their associated applications and modules, and a battery image 1252. Illustrated in FIG. 12C is the second guide data 1260 that includes the icons 1241, 1242, 1243, 1244, 1245, 1246 and 1247 corresponding to their associated first to seventh applications, and the battery image 1252. Using the battery image 1252, the second guide data 1260 informs the user 1200 that the user 1200 can enjoy calls for five hours (5 H Save) if the execution of all of the first to seventh applications 1241 to 1247 is terminated.

The guide generator 406 may include or insert, in the second guide data 1260, an On/Off button 1254 used for determining whether to terminate the execution of each of the applications and modules. By applying a user input for selecting the On/Off button 1254, the user 1200 may keep or terminate the execution of all of the first to seventh applications 1241 to 1247.

Although the first guide data 1220 is implemented in the form of the avatar 1222 and the speech bubble 1224 in this embodiment, the first guide data 1220 may be implemented in the form of a pop-up message, a widget or the like, and displayed on the screen 190 according to another embodiment of the present disclosure. As illustrated in FIG. 12C, the second guide data 1260 includes a settings screen for allowing the user to change settings of the mobile terminal 100 to save the residual power, or include the control data for controlling the mobile terminal 100 to display the settings screen. In this embodiment, the second guide data 1260 may correspond to a settings screen used for changing settings of the mobile terminal 100 to save the residual power, and based on the second guide data 1260, the user 1200 may change the settings of the mobile terminal 100. In other words, the second guide data 1260 includes the control data for controlling the mobile terminal 100.

Figure 13A:
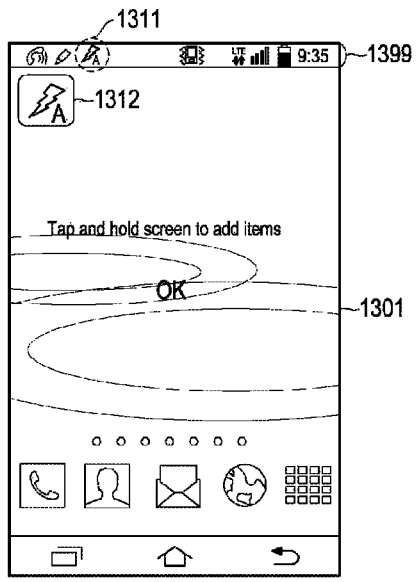
FIGS. 13A to 13C illustrate screens of an example of running a power management mode by a mobile terminal according to an embodiment of the present disclosure.
Figure 13B:
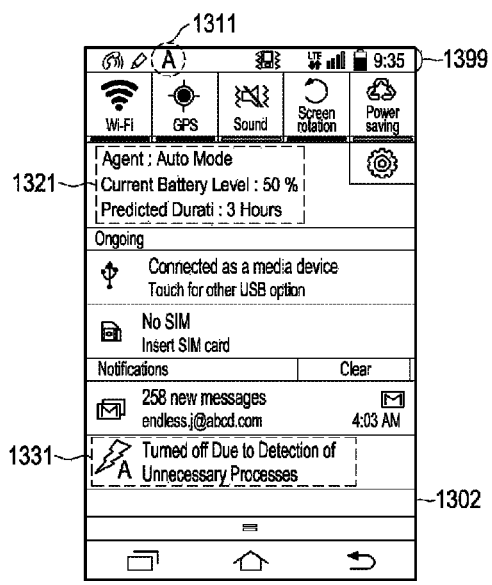
Figure 13C:
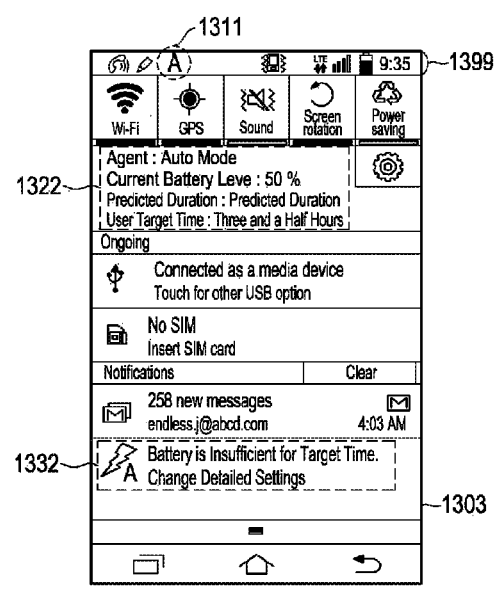

FIGS. 13A to 13C illustrate screens of an example of running a power management mode by the mobile terminal illustrated in FIG. 1.

Specifically, FIG. 13A illustrates a home screen 1301 of the mobile terminal 100 that is running the power management mode. FIGS. 13B and 13C illustrate preferences screens (or environment setting screen) 1302 and 1303 of the mobile terminal 100 that is running the power management mode.

Referring to FIG. 13A, a status bar 1399 indicating the current state of the mobile terminal 100 is displayed on the top of the home screen 1301. The mobile terminal 100 according to an embodiment of the present disclosure displays on the status bar 1399 an icon (or power management icon) 1311 indicating that the mobile terminal 100 is now in the power management mode. Accordingly, the power management icon 1311 may be displayed on the status bar 1399 of the mobile terminal 100 illustrated in FIGS. 13A to 13C. Alternatively, the controller 110 may control the screen 190 to display a power management icon 1312 even on the home screen 1301 as well. The power management icon 1312 displayed on the home screen 1301 may be displayed larger in size than the power management icon 1311 included in the status bar 1399. According to an embodiment of the present disclosure, the user applies a user input (e.g., a touch input of double-clicking the power management icon 1311) for selecting the power management icon 1311, to the mobile terminal 100. In response to the user input, the controller 110 displays the current state of the mobile terminal 100 that is running the power management mode, on the screen 190 instead of the home screen 1301. For example, the controller 110 may display the battery level of the mobile terminal 100 on the screen 190 in response to the user input.

FIGS. 13B and 13C illustrate the preferences screens 1302 and 1303 of the mobile terminal 100 that is automatically running the power management mode. The controller 110 according to an embodiment of the present disclosure may manually run the power management mode in response to the user input, or automatically run the power management mode without receiving a separate user input. FIGS. 13B and 13C illustrate the preferences screens 1302 and 1303 which are displayed when the power management mode (or automatic mode) is automatically run. In particular, FIG. 13C is assumed to correspond to the preferences screen 1303 which is displayed when the mobile terminal 100 runs a mode (or manual time mode) in which the target time is set by the user, among the power management modes.

Referring to FIG. 13B, the controller 110 displays the current state 1321 of the mobile terminal 100 that is running the automatic mode, on the screen 190 through the preferences screen 1302. On the preferences screen 1302 in FIG. 13B may be displayed the current state 1321 indicating that the current battery level of the mobile terminal 100 is 50% and the time (or predicted duration) for which the mobile terminal 100 may be run with the residual battery power is three hours. The controller 110 may display a notification 1331 associated with the power management mode on the preferences screen 1302. On the preferences screen 1302 in FIG. 13B may be displayed the notification 1331 of "Turned Off Due to Detection of Unnecessary Processes".

Referring to FIG. 13C, the controller 110 displays the current state 1322 of the mobile terminal 100 that is running the manual time mode, on the screen 190 through the preferences screen 1303. On the preferences screen 1303 in FIG. 13C may be displayed the current state 1322 indicating that the current battery level of the mobile terminal 100 is 50%, the time (or predicted duration) for which the mobile terminal 100 may be run with the residual battery power is three hours, and the use time (or user target time) desired by the user is three and a half hours. The controller 110 may display a notification 1332 associated with the power management mode on the preferences screen 1303. On the preferences screen 1303 in FIG. 13C may be displayed the notification 1332 of "Battery is Insufficient for Target Time. Change Detailed Settings".

Figures 14A, 14B:
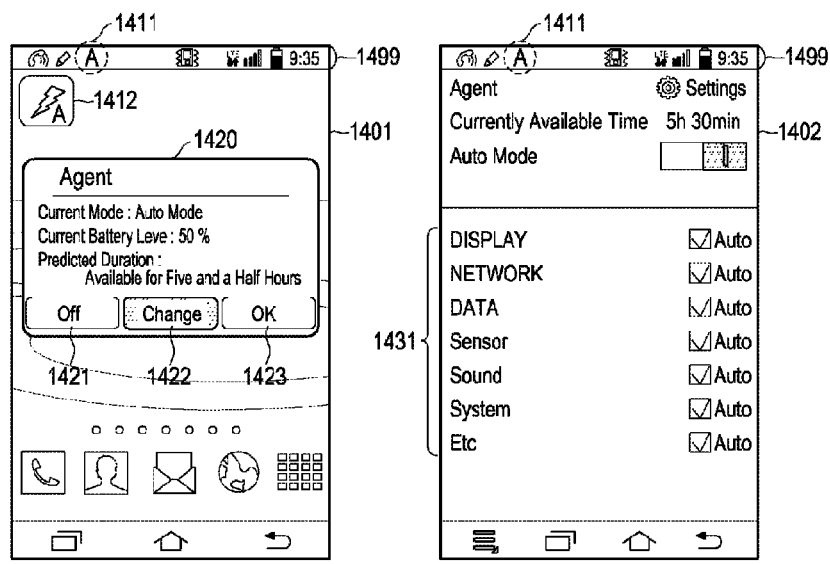
FIGS. 14A and 14B illustrate screens of an example of running a power management mode by a mobile terminal according to another embodiment of the present disclosure.

FIGS. 14A and 14B illustrate screens of another example of running a power management mode by the mobile terminal illustrated in FIG. 1. Specifically, FIGS. 14A and 14B illustrate a home screen 1401 and a preferences screen 1402, respectively, used for setting the automatic mode by the mobile terminal 100. Among them, FIG. 14A illustrates guide data (or pop-up message window) 1420 that is implemented in the form of a pop-up message and displayed on the screen 190.

Referring to FIGS. 14A and 14B, a status bar 1499 indicating the current state of the mobile terminal 100 is displayed on the top of each of the home screen 1401 and the preferences screen 1402. The mobile terminal 100 according to an embodiment of the present disclosure displays a power management icon 1411 on the status bar 1499. Referring to FIG. 14A, the mobile terminal 100 may display a power management icon 1412 on the home screen 1401 as well.

Referring to FIG. 14A, the controller 110 controls the screen 190 to display the pop-up message window 1420 on the home screen 1401 as guide data, the pop-up message window 1420 being used to request the user to determine whether to run the automatic mode even while in the power management mode. The controller 110 may display, in the pop-up window 1420, the operation mode (or current mode) that the mobile terminal 100 now intends to run, the battery level (or current battery level), and the time (or predicted time) for which the mobile terminal 100 can be run with the residual battery power. In the pop-up message window 1420 in FIG. 14A may be displayed the current state indicating that the operation mode that the mobile terminal 100 now intends to run is the automatic mode, the battery level is 50%, and the user may use or run the mobile terminal 100 with the residual battery power for five and a half hours. The controller 110 may include or insert buttons for setting the power management mode in the pop-up message window 1420, to receive a user input from the user. In the pop-up message window 1420 in FIG. 14A may be included an Off button 1421 for exiting the power management mode, a Change button 1422 for changing settings of the power management mode, and an OK button 1423 for keeping the current operation mode.

FIG. 14B illustrates the preferences screen 1402 displayed when the mobile terminal 100 is in the automatic mode. Referring to FIG. 14B, on the preferences screen 1402 may be displayed the current state indicating that the time (or currently available time) for which the user may run the mobile terminal 100 with the residual battery power is five and a half hours, and the automatic mode is being run even while in the power management mode. Referring to FIG. 14B, the currently available time may be five and a half hours and the automatic mode may be turned off. In order to run the automatic mode, the controller 110 may set, as Auto, a variety of options 1431 (e.g., DISPLAY, NETWORK, DATA, Sensor, Sound, System, and Etc) needed to perform various operations of the mobile terminal 100, as illustrated in FIG. 14B.

Figures 15A, 15B:
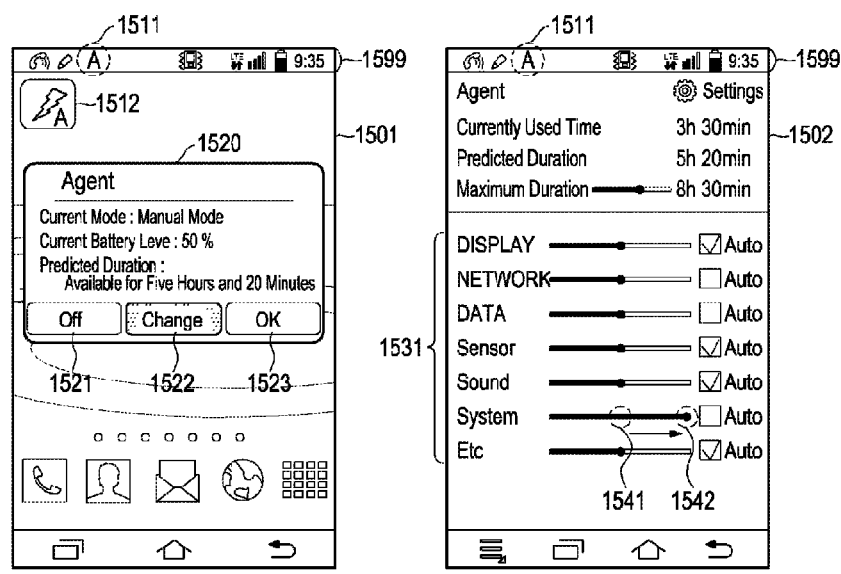
FIGS. 15A and 15B illustrate screens of an example of running a power management mode by a mobile terminal according to further another embodiment of the present disclosure.

FIGS. 15A and 15B illustrate screens of another example of running a power management mode by the mobile terminal illustrated in FIG. 1. Specifically, FIGS. 15A and 15B illustrate a home screen 1501 and a preferences screen 1502, respectively, used for setting the manual time mode by the mobile terminal 100. Among them, FIG. 15A illustrates guide data (or pop-up message window) 1520 that is implemented in the form of a pop-up message and displayed on the screen 190.

Referring to FIGS. 15A and 15B, a status bar 1599 indicating the current state of the mobile terminal 100 is displayed on the top of each of the home screen 1501 and the preferences screen 1502. The mobile terminal 100 according to an embodiment of the present disclosure displays a power management icon 1511 on the status bar 1599. Referring to FIG. 15A, the mobile terminal 100 may display a power management icon 1512 even on the home screen 1501 as well. According to an embodiment of the present disclosure, the mobile terminal 100 may receive, from the user, a user input for running any one of the automatic mode illustrated in FIGS. 14A and 14B and the manual time mode illustrated in FIGS. 15A and 15B.

Referring to FIG. 15A, the controller 110 may control the screen 190 to display the pop-up message window 1520 on the home screen 1501 as guide data, the pop-up message window 1520 being used to request the user to determine whether to run the manual time mode even while in the power management mode. The controller 110 may display, in the pop-up window 1520, the operation mode (or current mode) that the mobile terminal 100 now intends to run, the battery level (or current battery level), and the time (or predicted time) for which the mobile terminal 100 can be run with the residual battery power. In the pop-up message window 1520 in FIG. 15A may be displayed the current state indicating that the operation mode that the mobile terminal 100 now intends to run is the manual time mode, the battery level is 50%, and the user may use or run the mobile terminal 100 with the residual battery power for 5 hours and 20 minutes. The controller 110 may include or insert buttons for setting the power management mode in the pop-up message window 1520, to receive a user input from the user. In the pop-up message window 1520 in FIG. 15A may be included an Off button 1521 for exiting the power management mode, a Change button 1522 for changing settings of the power management mode, and an OK button 1523 for keeping the current operation mode.

FIG. 15B illustrates the preferences screen 1502 displayed when the mobile terminal 100 is in the manual time mode. Referring to FIG. 15B, on the preferences screen 1502 may be displayed the time (or currently used time) for which the user has used or run the mobile terminal 100, the time (or predicted duration) for which the mobile terminal 100 can be run in the manual time mode, or the maximum time (or maximum duration) for which the mobile terminal 100 can be run with the current residual battery power in the manual time mode. The user can use the mobile terminal for the predicted duration if the mobile terminal maintains the current operation mode (the manual mode), and the user can use the mobile terminal for the maximum duration if an operation of the mobile terminal is restricted to a minimum.

Referring to FIG. 15B, the currently used time may be three and a half hours, the predicted duration may be 5 hours and 20 minutes, and the maximum duration may be 8 hours and 30 minutes. In order to run the manual time mode, the controller 110 may set, as Auto or Manual, a variety of options 1531 (e.g., DISPLAY, NETWORK, DATA, Sensor, Sound, System, and Etc) needed to perform various operations of the mobile terminal 100, as illustrated in FIG. 15B. In the mobile terminal 100 in FIG. 15B, among the options 1531, DISPLAY, Sensor, Sound and Etc may be set as Auto, and NETWORK, DATA and System may be set as Manual, not Auto. In FIG. 15B, the user may adjust the usage of NETWORK, DATA and System by applying, to the mobile terminal 100, a user input for increasing or decreasing the length of a bar located on the right side of each of NETWORK, DATA and System which are set as Manual, among the options 1531. In FIG. 15B, the user may shift a dot on the bar from a first point 1541 to a second point 1542 in the direction of an arrow by applying a user input for increasing the length of the bar located on the right side of System.

So far, a description has been made of the configuration in which the mobile terminal 100 according to an embodiment of the present disclosure receives settings for each of the options 1531 from the user through the preferences screen 1502 according to the manual time mode. According to an embodiment of the present disclosure, the mobile terminal 100 may receive, from the user, not only settings for the options 1531 illustrated in FIG. 15B, but also various detailed settings for each of the options 1531. For example, the user may adjust each of a Ringtone volume, a Notifications volume and a System volume of Sound among the options 1531. The mobile terminal 100 may adjust detailed settings for each of the options 1531 by providing to the user a detailed settings screen for adjusting detailed settings for each of the options 1531 (e.g., DISPLAY, NETWORK, DATA, Sensor, System, Sound, etc.).

Figure 16A:
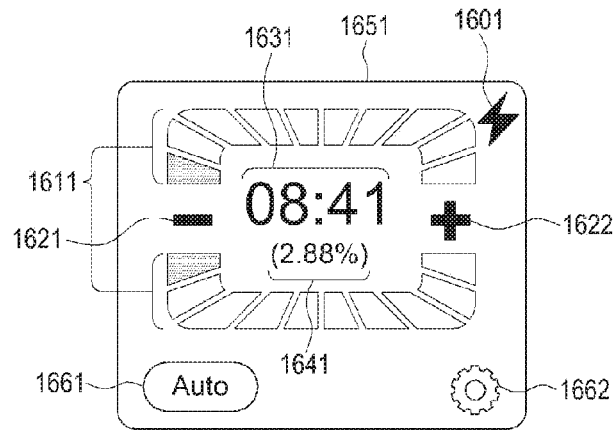
FIGS. 16A to 16C illustrate portions of screens of an example of running a power management mode by a mobile terminal according to yet another embodiment of the present disclosure.
Figure 16B:
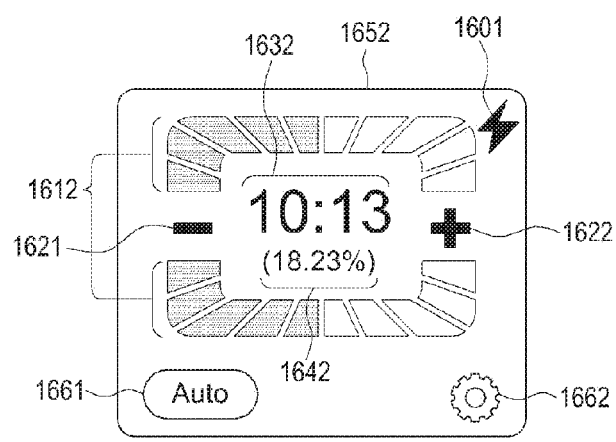
Figure 16C:
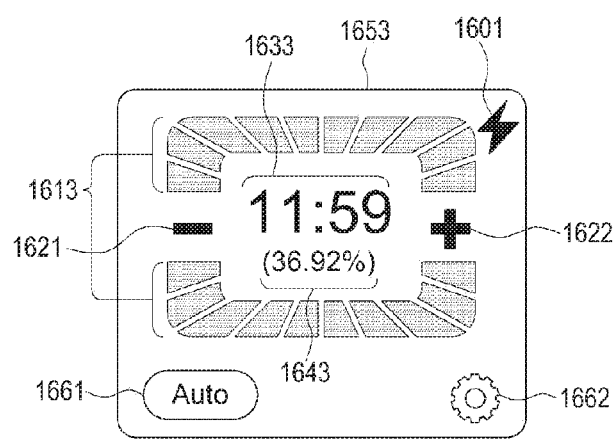

FIGS. 16A to 16C illustrate portions of screens of another example of running a power management mode by the mobile terminal illustrated in FIG. 1.

As illustrated in FIGS. 16A to 16C, the controller 110 of the mobile terminal 100 according to an embodiment of the present disclosure may manage the intensity of the power management in the battery on a step-by-step basis. FIGS. 16A to 16C illustrate examples of dividing the intensity of the power management into levels 1 to 10, and running the power management mode according to the levels. It will be assumed in this embodiment that as for the intensity of the power management, level 1 corresponds to the lowest intensity while level 10 corresponds to the highest intensity, and as the level is higher, the intensity of the power management is also higher.

FIG. 16A illustrates a home screen 1651 for the case where the intensity of the power management corresponds to level 1. On the home screen 1651, the intensity of the power management is represented by a bar 1611 having a shape in which ten rectangles surround both the top and bottom edges. In FIG. 16A, the screen 190, under control of the controller 110, may display only one of the rectangles included in the bar 1611 in a darkened way, in order to represent the level-1 power management intensity. In addition, on the home screen 1651 may be displayed an indicator 1601 indicating that the mobile terminal 100 is now running the power management mode.

The screen 190, under control of the controller 110, displays the total use time (or available time) 1631 that the user can use or run the mobile terminal 100, depending on the power management level. Further, the screen 190, under control of the controller 110, displays the power improvement ratio 1641 under the available time 1631. The power improvement ratio 1641 is a ratio of the available time in the power management mode to the available time in the non-power management mode (e.g., normal mode). Referring to FIG. 16A, the power improvement ratio 1641 may be 2.88%, if the power management level is set to 1.

According to an embodiment of the present disclosure, the user adjusts the power management intensity by applying, to the mobile terminal 100, a user input for selecting level adjustment buttons 1621 and 1622 on the left and right sides of the available time 1631. If a user input for selecting the minus button 1621 is applied, the controller 110 lowers the power management intensity of the mobile terminal 100. On the other hand, if a user input for selecting the plus button 1622 is applied, the controller 110 increases the power management intensity of the mobile terminal 100. The user may control the mobile terminal 100 to automatically perform the power management, by applying a user input for selecting an Auto button 1661. The user determines the detailed settings in the power management mode by applying a user input for selecting a settings button 1662. For example, the user may adjust each of, for example, DISPLAY, NETWORK, DATA, Sensor, Sound, System, and Etc illustrated in FIG. 15B, by applying a user input for selecting the settings button 1662.

FIG. 16B illustrates a home screen 1652 for the case where the power management intensity corresponds to level 5. In FIG. 16B, the screen 190, under control of the controller 110, displays five rectangles on the top and bottom edges among the rectangles included in a bar 1612 in a darkened way, in order to represent the level-5 power management intensity. In addition, on the home screen 1652 is displayed the indicator 1601 indicating that the mobile terminal 100 is now running the power management mode.

The screen 190 displays the available time 1632 corresponding to the power management level, on the home screen 1652. Further, the screen 190, under control of the controller 110, displays the power improvement ratio 1642 under the available time 1632. Referring to FIG. 16B, the power improvement ratio 1642 may be 18.23%, if the power management level is set to 5. According to an embodiment of the present disclosure, the user adjusts the power management intensity by applying, to the mobile terminal 100, a user input for selecting the level adjustment buttons 1621 and 1622 on the left and right sides of the available time 1632, like in FIG. 16A. The user may control the mobile terminal 100 to automatically perform the power management, by applying a user input for selecting the Auto button 1661, to the mobile terminal 100. The user determines the detailed settings in the power management mode by applying a user input for selecting the settings button 1662.

FIG. 16C illustrates a home screen 1653 for the case where the intensity of the power management corresponds to level 10. On the home screen 1653, the intensity of the power management is represented by a bar 1613 having a shape in which ten rectangles surround both the top and bottom edges. In FIG. 16C, the screen 190, under control of the controller 110, displays all of the ten rectangles on the top and bottom edges included in the bar 1613 in a darkened way, in order to represent the level-10 power management intensity. In addition, on the home screen 1653 is displayed the indicator 1601 indicating that the mobile terminal 100 is now running the power management mode.

The screen 190 displays the available time 1633 corresponding to the power management level, on the home screen 1653. Further, the screen 190, under control of the controller 110, may display the power improvement ratio 1643 under the available time 1633. Referring to FIG. 16C, the power improvement ratio 1643 may be 36.92%, if the power management level is set to 10. According to an embodiment of the present disclosure, the user adjusts the power management intensity by applying, to the mobile terminal 100, a user input for selecting the level adjustment buttons 1621 and 1622 on the left and right sides of the available time 1633, like in FIGS. 16A and 16B. The user may control the mobile terminal 100 to automatically perform the power management, by applying a user input for selecting the Auto button 1661. The user determines the detailed settings in the power management mode by applying a user input for selecting the settings button 1662.

Figure 17A:
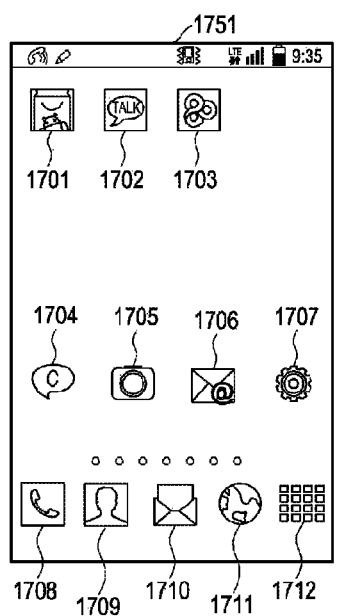
FIGS. 17A and 17B illustrate screens of an example of running a power management mode by a mobile terminal according to still another embodiment of the present disclosure.
Figure 17B:
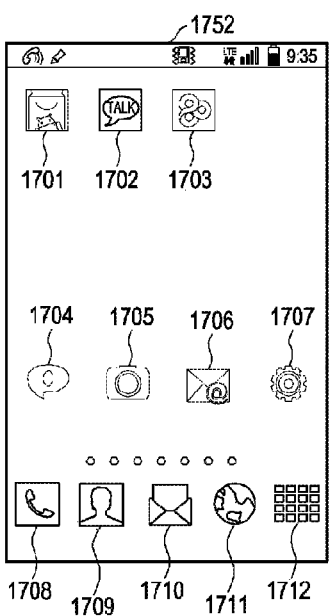

FIGS. 17A and 17B illustrate screens of another example of running a power management mode by the mobile terminal illustrated in FIG. 1.

FIG. 17A illustrates the screen 190 in the mobile terminal 100 displayed before the power management mode is run, and FIG. 17B illustrates the screen 190 displayed after the power management mode is run. It will be assumed in FIGS. 17A and 17B that the screen 190 displays home screens 1751 and 1752, respectively.

Referring to FIGS. 17A and 17B, on each of the home screens 1751 and 1752 are displayed icons 1701 to 1712 corresponding to their associated applications and modules. It will be assumed in this embodiment that first to twelfth icons 1701, 1702, 1703, 1704, 1705, 1706, 1707, 1708, 1709, 1710, 1711 and 1712 are displayed on each of the home screens 1751 and 1752.

The execution manager 410 in the controller 110 according to an embodiment of the present disclosure controls or determines whether to display each of the icons 1701 to 1712 on the home screens 1751 and 1752. The execution manager 410 may determine whether to display each of the icons 1701 to 1712, according to the priority of each of the applications and modules corresponding to their associated icons 1701 to 1712. If the power management mode is run, the execution manager 410 according to an embodiment of the present disclosure determines whether each of the applications and modules can be executed, according to the priority of the application or the module. The priority according to an embodiment of the present disclosure may be lower, as the execution of its associated application or module is first limited in the power management mode. For example, if it is assumed that a first application is executed both in the normal mode and the power management mode and a second application is executed only in the normal mode, the first application may be higher in priority than the second application. For example, if the user has set the mobile terminal 100 such that the mobile terminal 100 cannot perform Bluetooth communication in the power management mode, the execution manager 410 gives low priorities to the applications and modules associated with the Bluetooth communication. The execution manager 410 controls the screen 190 such that the icons corresponding to the applications and modules associated with the Bluetooth communication cannot be displayed on the screen 190 in the power management mode.

As illustrated in FIG. 17A, the execution manager 410 controls the screen 190 or the screen controller 195 to display all of the icons 1701 to 1712 on the home screen 1751 in the non-power management mode or the normal mode.

As illustrated in FIG. 17B, the execution manager 410 controls the screen 190 or the screen controller 195 to display only some of the icons 1701 to 1712 on the home screen 1752 in the power management node. In FIG. 17B, the screen 190 displays only the second icon 1702, the eighth icon 1708, the ninth icon 1709, the tenth icon 1710, the eleventh icon 1711 and the twelfth icon 1712 on the home screen 1752. In this embodiment, the applications and modules corresponding to the second icon 1702, the eighth icon 1708, the ninth icon 1709, the tenth icon 1710, the eleventh icon 1711 and the twelfth icon 1712 represent high-priority applications and modules, while the applications and modules corresponding to the icons (e.g., the first icon 1701, the third icon 1703, the fourth icon 1704, the fifth icon 1705, the sixth icon 1706 and the seventh icon 1707), which are not displayed or activated on the home screen 1752, represent low-priority applications and modules. In FIG. 17B, as the power management mode is run, the icons 1701, 1703, 1704, 1705, 1706 and 1707 corresponding to the low-priority applications and modules are not displayed on the home screen 1752, thereby preventing the power consumption which may occur as the user executes the applications and modules corresponding to the icons 1701, 1703, 1704, 1705, 1706 and 1707.

According to another embodiment of the present disclosure, the screen 190 may display the first icon 1701, the third icon 1703, the fourth icon 1704, the fifth icon 1705, the sixth icon 1706 and the seventh icon 1707 on the home screen 1752 even in the power management mode. In this case, the screen 190 may display the first icon 1701, the third icon 1703, the fourth icon 1704, the fifth icon 1705, the sixth icon 1706 and the seventh icon 1707 in a form different from that of the second icon 1702, the eighth icon 1708, the ninth icon 1709, the tenth icon 1710, the eleventh icon 1711 and the twelfth icon 1712. For example, the screen 190 may display the icons 1701, 1703, 1704, 1705, 1706 and 1707 in a semi-transparent way, or halve the sizes of the icons 1701, 1703, 1704, 1705, 1706 and 1707, allowing the user to recognize the visibility different from that of the icons 1702, 1708, 1709, 1710, 1711 and 1712.

In this power management mode, if the high-priority icons 1702, 1708, 1709, 1710, 1711 and 1712 and the low-priority icons 1701, 1703, 1704, 1705, 1706 and 1707 are all displayed, the execution manager 410 controls the screen 190 to display a warning or a pop-up window indicating the non-executability of the applications and modules corresponding to the low-priority icons 1701, 1703, 1704, 1705, 1706 and 1707, each time any of the low-priority icons 1701, 1703, 1704, 1705, 1706 and 1707 is selected. For example, if the user has selected the third icon 1703 in the power management mode, since a third application corresponding to the third icon 1703 has low priority, the execution manager 410 controls the screen 190 to display a pop-up window indicating the non-executability of the third application. The execution manager 410 controls the mobile terminal 100 such that the third application cannot be executed. According to another embodiment of the present disclosure, if the user has selected the third icon 1703 corresponding to the low-priority third application, the execution manager 410 may control the screen 190 to display a pop-up window or a notice indicating that the currently running power management mode needs to be released or turned off to execute the third application.

FIGS. 18A to 18D illustrate screens of another example of running a power management mode by the mobile terminal illustrated in FIG. 1.

FIG. 18A illustrates a home screen 1851 displayed before the power management mode is run, or displayed in the normal mode, and FIGS. 18B, 18C and 18D illustrate home screens 1852, 1853 and 1854 displayed in the power management mode, respectively.

As illustrated in FIG. 18A, on the home screen 1851 in the normal mode is displayed first to twelfth icons 1811, 1812, 1813, 1814, 1815, 1816, 1817, 1818, 1819, 1820, 1821 and 1822. In the normal mode, the controller 110 may adjust the screen 190 such that the brightness of the screen 190 may be set as a default value. For example, in the normal mode, the screen 190, under control of the controller 110, displays the home screen 1851 such that background images or background colors in the home screen 1851 have their unique brightness values.

FIG. 18B illustrates the home screen 1852 for the case where the intensity of the power management is low in the power management mode. Referring to FIG. 18B, the controller 110 may adjust the brightness of the home screen 1852 to be lower than that in the normal mode. For example, the screen 190, under control of the controller 110, displays the background images or background colors in the home screen 1852 to be darker than those in the normal mode. The controller 110 displays a pop-up window 1832 on the home screen 1852, thereby informing the user of the switching of the mobile terminal 100 to the power management mode, and of the available time.

FIG. 18C illustrates the home screen 1853 for the case where the intensity of the power management is medium in the power management mode. Referring to FIG. 18C, the controller 110 may adjust the brightness of the home screen 1853 to be lower than that when the intensity of the power management is low. For example, the screen 190, under control of the controller 110, displays the background images or background colors in the home screen 1853 to be darker than those when the intensity of the power management is low. The controller 110 displays a pop-up window 1833 on the home screen 1853, thereby informing the user of the switching of the mobile terminal 100 to the power management mode, and of the available time. According to an embodiment of the present disclosure, as the power management intensity is higher, the icons displayed on the home screen 1853 may be less in number. In FIG. 18C, only the eighth to twelfth icons 1818, 1819, 1820, 1821 and 1822 are displayed on the home screen 1853.

As described above, the controller 110 according to an embodiment of the present disclosure adjusts the number of icons displayed on the screen 190 depending on the power management intensity. The number of icons may be less, as the power management intensity is higher. Although the first to twelfth icons 1811 to 1822 are all displayed in FIGS. 18A and 18B, only the eighth to twelfth icons 1818 to 1822 are displayed on the screen 190 in FIG. 18C.

FIG. 18D illustrates the home screen 1854 for the case where the intensity of the power management is high in the power management mode. Referring to FIG. 18D, the controller 110 may adjust the brightness of the home screen 1854 to be lower than that when the intensity of the power management is medium. For example, the screen 190, under control of the controller 110, displays the background images or background colors in the home screen 1854 to be darker than those when the power management intensity is medium. The background colors may be displayed darker in FIGS. 18B to 18D. The controller 110 may display a pop-up window 1834 on the home screen 1854, thereby informing the user of the switching of the mobile terminal 100 to the power management mode, and of the available time.

According to an embodiment of the present disclosure, if the power management intensity is high, only the icons 1823, 1824, 1825, 1826, 1827, 1828, 1829 and 1830 corresponding to their associated emergency contacts are displayed on the screen 190. Accordingly, in FIG. 18D, the icons 1811 to 1822 other than the icons 1823 to 1830 corresponding to the emergency contacts are not displayed on the home screen 1854.

Although the mobile terminal 100 according to an embodiment of the present disclosure informs the user of its switching to the power management mode, the available time and the like, in the form of the pop-up windows 1832, 1833 and 1834, the mobile terminal 100 may provide the above information to the user using at least one of an image, a text, a speech bubble, a pop-up message, a widget, an avatar and an animation according to another embodiment of the present disclosure.

As is apparent from the foregoing description, an aspect of the present disclosure provides a mobile terminal for guiding a user, allowing the user to efficiently manage the residual power of the mobile terminal, and a method for managing power thereof.

The method for managing power of a mobile terminal according to an embodiment of the present disclosure may be implemented in the form of hardware, software or a combination thereof. The software may be stored in a volatile or non-volatile storage (e.g., an erasable/re-writable ROM), a memory (e.g., a RAM, a memory chip, a memory device, or a memory Integrated Circuit (IC)), or an optically/magnetically writable machine (or computer)-readable storage medium (e.g., Compact Disk (CD), Digital Versatile Disk (DVD), magnetic disk or magnetic tape). The power management method according to an embodiment of the present disclosure may be implemented by a computer or a mobile terminal, each of which includes a controller and a memory. It can be noted that the memory is an example of a machine-readable storage medium suitable to store a program or programs including instructions for implementing embodiments of the present disclosure. Therefore, the present disclosure may include a program including codes for implementing the apparatus or method as defined by the appended claims, and a machine (or computer)-readable storage medium storing the program. The program may be electronically carried by any media such as communication signals which are transmitted through wire/wireless connections.

The mobile terminal may receive and store the program from a program server, to which the mobile terminal is connected by wires or wirelessly. The program server may include a memory for storing a program including instructions for allowing the mobile terminal to manage its power, and information needed for the power management method, a communication unit for performing wired/wireless communication with the mobile terminal, and a controller for transmitting the program to the mobile terminal automatically or at the request of the mobile terminal.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for managing power in an electronic device, the method comprising:
    recording logs for each of at least one application every first time;
    analyzing the logs every second time, and determining power consumption information including a pattern, in which each of the at least one application is executed, according to the analysis results;
    determining whether residual power indicative of residual battery power of the electronic device is less than or equal to reference power; and
    if the residual power is less than or equal to the reference power, displaying guide data based on the residual power and the power consumption information indicating power amount which is used by at least one application in the electronic device,
    wherein the guide data includes at least one method for reducing power consumption of the electronic device.

2. The method of claim 1, wherein the guide data includes at least one of an image, a text, a speech bubble, a pop-up message, a widget, an avatar, or an animation.

3. The method of claim 1, further comprising:
    generating the guide data based on the residual power and the power consumption information.

4. The method of claim 1, further comprising:
    updating the pattern based on at least one application executed using the residual power after the guide data is displayed.

5. The method of claim 1, further comprising:
    if a user input for executing the at least one method included in the guide data is received, executing at least one operation corresponding to the user input from among the at least one method.

6. The method of claim 5, wherein executing the at least one operation corresponding to the user input comprises:
    terminating execution of the at least one the application.

7. The method of claim 5, further comprising:
updating the pattern based on the execution of the at least one operation.

8. The method of claim 1, further comprising:
before determining whether the residual power is less than or equal to the reference power, receiving a use time of at least one application to be executed.

9. The method of claim 8, wherein determining whether the residual power is less than or equal to the reference power comprises:
calculating required power for executing the at least one application for the use time; and
determining whether the residual power is greater than or equal to the required power.

10. A electronic device for managing power, comprising:
a memory;
a display; and
a processor configured to:
record logs for each of at least one application every first time in the memory,
analyze the logs every second time, and determine power consumption information including a pattern, in which each of the at least one application is executed, according to the analysis results,
determine whether residual power indicative of residual battery power of the electronic device is less than or equal to reference power, and
if the residual power is less than or equal to the reference power, control to display, on the display, guide data based on the residual power and the power consumption information indicating power amount which is used by at least one application in the electronic device,
wherein the guide data includes at least one method for reducing power consumption of the electronic device.

11. The electronic device of claim 10, wherein the guide data includes at least one of an image, a text, a speech bubble, a pop-up message, a widget, an avatar, or an animation.

12. The electronic device of claim 10, wherein the processor is further configured to:
control to generate the guide data based on the residual power and the power consumption information.

13. The electronic device of claim 10, wherein the processor is further configured to:
control to update the pattern based on at least one operation executed using the residual power after the guide data is displayed.

14. The electronic device of claim 10, wherein the processor is further configured to:
if a user input for executing the at least one method included in the guide data is received, execute at least one operation corresponding to the user input from among the at least one method.

15. The electronic device of claim 14, wherein the processor is further configured to:
terminate the execution of the at least one application.

16. The electronic device of claim 14, wherein the processor is further configured to:
control to update the pattern based on the execution of the at least one operation.

17. The electronic device of claim 10, wherein the processor is further configured to:
control to obtain a use time of at least one application to be executed,
calculate required power for executing the at least one application for the use time, and
determine whether the residual power is greater than or equal to the required power.

18. A non-transitory computer readable storage medium with instructions stored thereon, the instructions executable by at least one processor of an electronic device to cause the at least one processor to:
record logs for each of at least one application every first time,
analyze the logs every second time, and determine power consumption information including a pattern, in which each of the at least one application is executed, according to the analysis results,
determine whether residual power indicative of residual battery power of an electronic device is less than or equal to reference power, and
if the residual power is less than or equal to the reference power, control to display guide data based on the residual power and the power consumption information indicating power amount which is used by at least one application in the electronic device,
wherein the guide data includes at least one method for reducing power consumption of the electronic device.

* * * * *